(12) United States Patent
Fassier et al.

(10) Patent No.: US 10,175,704 B2
(45) Date of Patent: Jan. 8, 2019

(54) THERMOSTAT UNIT AND ASSOCIATED SYSTEM AND METHOD

(71) Applicant: APPAREILS CONNECTÉS CASA LTÉE, Québec (CA)

(72) Inventors: Martin Fassier, Quebec (CA); Patrick Pépin, Quebec (CA)

(73) Assignee: APPAREILS CONNECTÉS CASA LTÉE, Québec (CA)

( * ) Notice: Subject to any disclaimer, the term of this patent is extended or adjusted under 35 U.S.C. 154(b) by 0 days.

(21) Appl. No.: 15/121,846

(22) PCT Filed: Mar. 2, 2015

(86) PCT No.: PCT/CA2015/050156
§ 371 (c)(1),
(2) Date: Aug. 26, 2016

(87) PCT Pub. No.: WO2015/127566
PCT Pub. Date: Sep. 3, 2015

(65) Prior Publication Data
US 2017/0017247 A1    Jan. 19, 2017

Related U.S. Application Data

(60) Provisional application No. 61/946,158, filed on Feb. 28, 2014.

(51) Int. Cl.
*G05D 23/19* (2006.01)
*H05B 1/02* (2006.01)
(Continued)

(52) U.S. Cl.
CPC ......... *G05D 23/19* (2013.01); *G05D 23/1905* (2013.01); *G05D 23/1934* (2013.01);
(Continued)

(58) Field of Classification Search
CPC ........ H02J 7/0068; H02J 7/345; G05D 23/19; G05D 23/1905; G05D 23/1934; H01B 1/0275; H05B 1/0275
See application file for complete search history.

(56) References Cited

U.S. PATENT DOCUMENTS 4,433,719 A  2/1984 Cherry et al.
7,476,988 B2  1/2009 Mulhouse et al.
(Continued)

OTHER PUBLICATIONS

International Search Report from corresponding International Application No. PCT/CA2015/050156.

*Primary Examiner* — Marc Norman
(74) *Attorney, Agent, or Firm* — Hauptman Ham, LLP

(57) ABSTRACT

The present invention relates to a thermostat system, to a thermostat unit, as well as to a method for managing power supply in a thermostat unit. A thermostat unit is connected between a power supply and a resistive heating element. Input power is received at the thermostat unit. A temperature difference is calculated between a target temperature and a current temperature. The input power is controlled by operating a power supply module between a heating mode wherein in the input power is channeled to the output port for feeding the resistive heating element based on the temperature difference and a regenerative mode wherein the input power is channeled to an energy storage device for charging said energy storage device in order to supply power therefrom to electronic components of the thermostat unit.

20 Claims, 52 Drawing Sheets

(51) Int. Cl.
*H02J 7/00* (2006.01)
*H02J 7/34* (2006.01)

(52) U.S. Cl.
CPC .......... *H02J 7/0068* (2013.01); *H05B 1/0275* (2013.01); *H02J 7/345* (2013.01)

(56) References Cited

U.S. PATENT DOCUMENTS

| | | |
|---|---|---|
| 7,590,499 B2 | 9/2009 | Ha et al. |
| 8,523,083 B2 | 9/2013 | Warren et al. |
| 8,550,370 B2 | 10/2013 | Barrett et al. |
| 2007/0290882 A1* | 12/2007 | Consorte .............. G05B 19/042 340/13.24 |
| 2013/0213952 A1 | 8/2013 | Boutin et al. |
| 2014/0000858 A1 | 1/2014 | Frank |
| 2014/0266669 A1 | 9/2014 | Fadell et al. |

* cited by examiner

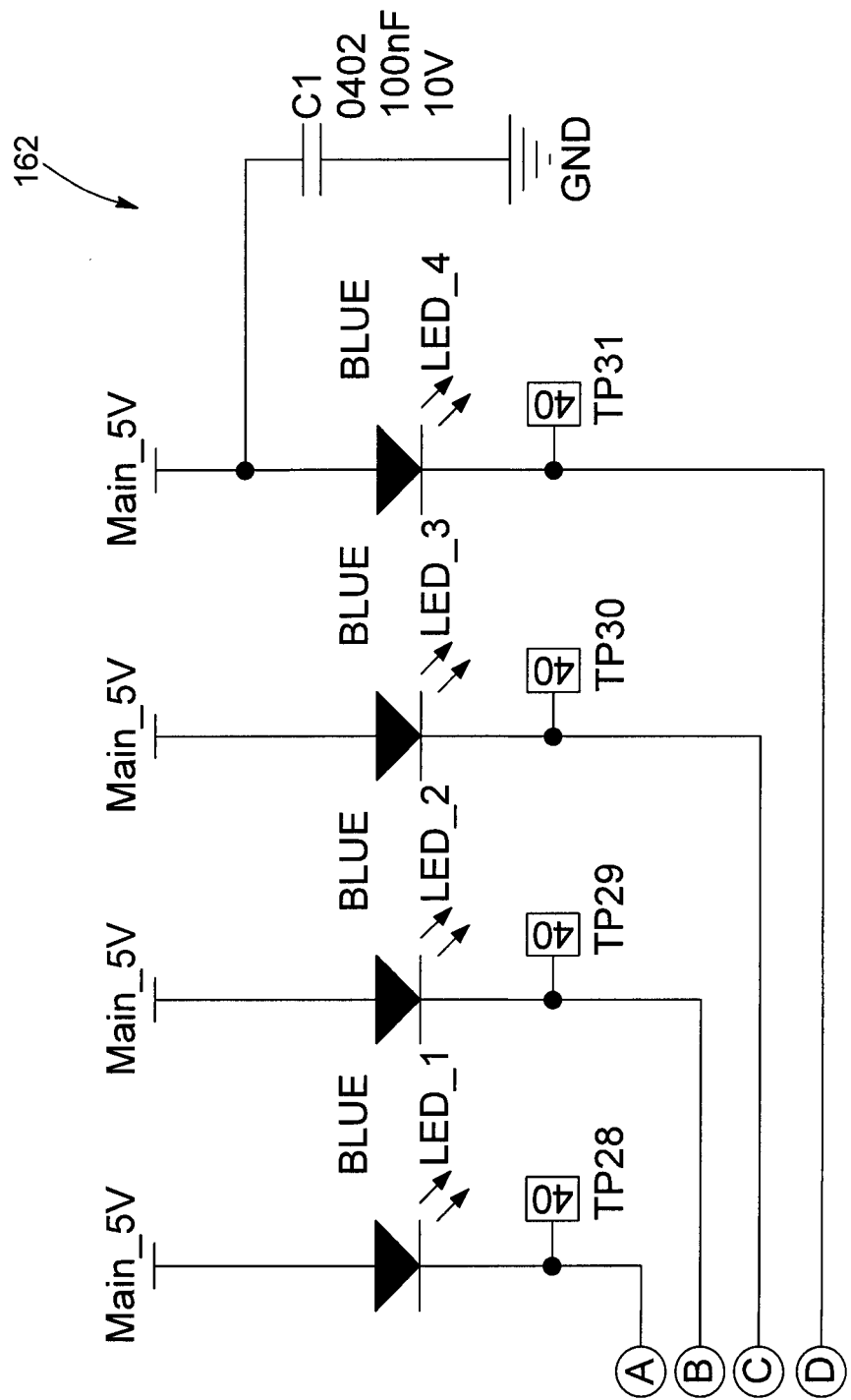

Switch OFF Backfeed if < 4.0V a: Data header - Language set via interface
b: Actual temperature as read by onboard sensor
c: Celsius or Fahrenheit - Locale set via interface
d: Temperature set point - Via interface or local buttons
e: Triac load status
f: Clock - Locale set via interface
g: Manual mode icon
h: Connectivity icon
i: Locked controls icon

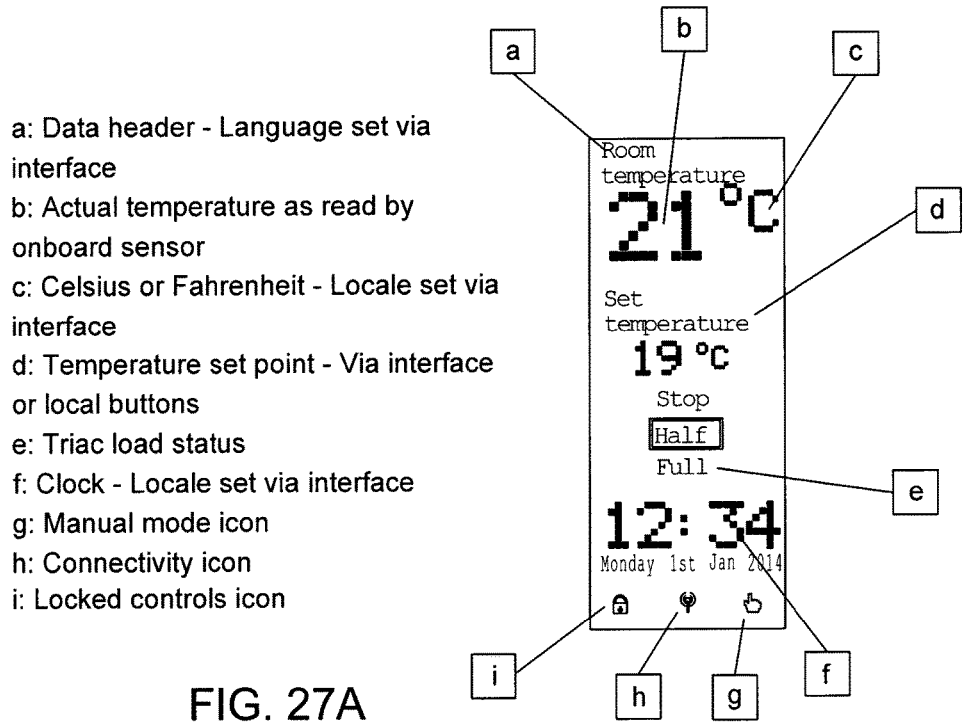

FIG. 27A j: UP button - Capacitive button
k: DOWN button - Capacitive button
l: RESET button (not shown) - Mechanical recessed button

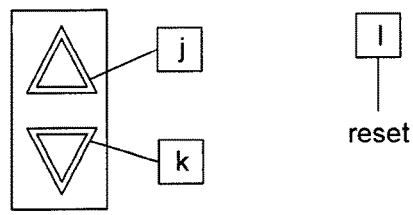

FIG. 27B m: Status LED - Visual feedback of load status
n: Nightlight LED - Controlable via interface or local buttons

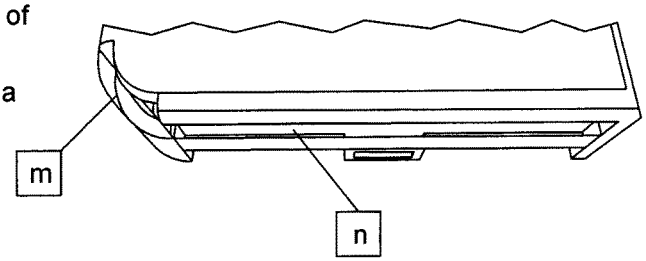

FIG. 27C

THERMOSTAT UNIT AND ASSOCIATED SYSTEM AND METHOD

FIELD

The present invention relates to the field of thermostats. More particularly, the present invention relates to a thermostat system, to a thermostat unit, as well as to a method for managing power supply in a thermostat unit.

BACKGROUND

Programmable thermostat units are commonly used in cool climates for controlling electric baseboard heaters. It is desirable to further enhance the thermostat units to better manage the energy consumption in a given home or building area. For example, an interface may be added to each thermostat unit to be in communication with each other and/or with a central control system. Moreover, solid-state controls such as TRIACs are not as energy-efficient as other means of switching, making it desirable to implement a better solid-state switching solution.

However any additional electronic component or feature added to the thermostat units requires energy from the electric source in order to operate it. Further, as is known, such thermostat units are connected in a 2-wire configuration known as line-to-line, as illustrated in FIG. 1A for electric baseboard heaters. As can be seen, the 2-wire ($L_1$ and $L_2$) configuration does not provide a "ground" to allow for a difference of potential to exist. Therefore, it is challenging in such a configuration to provide a stable and reliable flow of energy to the circuit and/or other electronic component(s) of the thermostat. This challenge is further apparent in an "in-line" configuration, where only $L_1$ or $L_2$ is available to power the thermostat (i.e. $L_1$ and $L_2$ are connected through different electrical boxes).

Moreover, it is also desirable for the operative components to remain latent for weeks or months in order to monitor room temperature during periods of the year when heating is not needed. It is also desirable to provide an improved system which is reasonably priced, thereby limiting the hardware-based solutions. It is also desirable to provide a system which is compatible with many communication protocols and that may be retrofitted by a user, both in its physical installation and its communication systems.

Therefore, there is a need for an improved system for electric heater thermostats provided with communication module for centrally controlling the thermostats in a more energy efficient manner. Such centralized control devices are already marketed for furnace-type heating or cooling systems, but those devices are fed DC current by the equipment they are controlling, as shown in FIG. 1B. Also, there is typically a single unit in a centrally-configured system while baseboard-heating operation requires one unit per room and typically one unit per heater thus making the networking capability more important.

Known to the Applicant are U.S. Pat. No. 7,476,988 B2 (MULHOUSE et al.); U.S. Pat. No. 7,590,499 B2 (HA et al.); U.S. Pat. No. 8,523,083 B2 (WARREN et al.); U.S. Pat. No. 8,550,370 B2 (BARRETT et al.), and United States patent applications Nos. 2013/0213952 A1 (BOUTIN et al.) and 2014/0000858 A1 (FRANK).

In light of the aforementioned, there is a need for an improved system which, by virtue of its design and components, would be able to overcome some of the above-discussed prior art concerns.

SUMMARY

The object of the present invention is to provide a system which, by virtue of its design and components, satisfies some of the above-mentioned needs and is thus an improvement over other related systems and/or methods known in the prior art.

In accordance with an aspect, there is provided a method for managing power supply in a thermostat unit connected between a power supply and a resistive heating element, the method comprising: (a) receiving, via an input port, input power from a power supply; (b) providing a target temperature and a current temperature; (c) calculating, by means of a calculator, a temperature difference between the current temperature and the target temperature; (d) controlling the input power by operating a power supply module between a heating mode wherein in the input power is channeled to the output port for feeding the resistive heating element based on the temperature difference and a regenerative mode wherein the input power is channeled to an energy storage device for charging said energy storage device in order to supply power therefrom to electronic components of the thermostat unit.

In accordance with another aspect, there is provided a thermostat unit connectable between a power supply and a resistive heating element, the thermostat unit comprising: an input port for receiving input power from the power supply; a memory for storing a target temperature and a current temperature; a calculator integrated in a controller, for calculating a temperature difference between the current temperature and the target temperature; a power supply module integrated in the controller, for controlling the input power received; an energy storage device connected between the power supply module and electronic components of the thermostat unit; and an output port connected to the power supply module and being connectable to the resistive heating element, wherein the power supply module is operable between a heating mode wherein in the input power is channeled to the output port for supplying power to the resistive heating element based on the temperature difference and a regenerative mode wherein the input power is channeled to the energy storage device, in order to supply power to said electronic components.

In accordance with yet another aspect, there is provided a thermostat system comprising: a central controller having a communication module for sending a control signal; and a plurality of the above-described thermostat units, wherein each thermostat unit is adapted to receive the control signal from the central controller via the communication module and to operate the power supply module in response to the control signal received.

In accordance with still another aspect, there is provided a non-transitory computer-readable memory storing data and instructions for execution by a processor to manage power supply in a thermostat unit, when the thermostat unit is connected between a power supply to receive input power supply via an input port, and a resistive heating element, said data and instructions comprising: code means for providing a target temperature and a current temperature; code means for calculating, by means of a calculator, a temperature difference between the current temperature and the target temperature; code means for controlling the input power by operating a power supply module of the thermostat unit between a heating mode wherein in the input power is channeled to the output port for feeding the resistive heating element based on the temperature difference and a regenerative mode wherein the input power is channeled to an energy storage device for charging said energy storage device in order to supply power therefrom to electronic components of the thermostat unit.

The objects, advantages and features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 27A is an image of a display screen of the thermostat unit shown in FIG. 5.

FIG. 27B is an image of a command buttons of the thermostat unit shown in FIG. 5.

FIG. 27C is an image of components of the thermostat unit shown in FIG. 5.

DETAILED DESCRIPTION OF THE DRAWINGS

In the following description, the same numerical references refer to similar elements. The embodiments, geometrical configurations, materials mentioned and/or dimensions shown in the figures or described in the present description are preferred embodiments only, given for exemplification purposes only. Broadly described, with reference to the accompanying drawings, a wall-mount thermostat unit replaces existing bimetallic, mercury switch and electronic wall thermostats. The thermostat unit is connected to an electricity supply at 120V per leg and does not require a neutral. One or both legs of the 240 VAC circuit may be used to power the device. The device is configured to communicate with a remote management server, via the internet or alternatively with a home automation gateway enabling the homeowner to control all devices from a single location and with neighbouring devices in a mesh network in order to achieve maximum heating capacity and energy conservation.

Figure 1A:
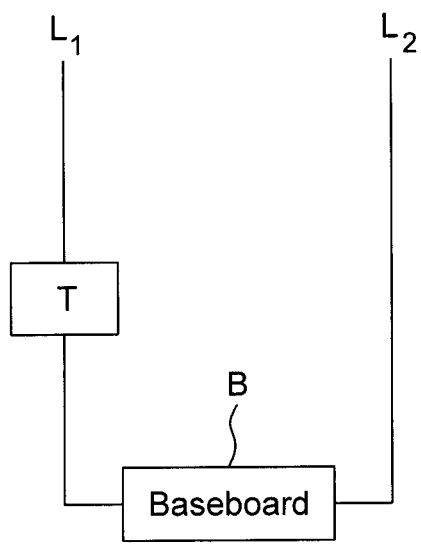
FIG. 1A (prior art) is a circuit diagram of a conventional electronic or mechanical thermostat T connected to an electric baseboard heater B in an in-line or 2-wire configuration FIG. 1B (prior art) is a circuit diagram of a conventional thermostat T connected to a central heating furnace F and fed with DC current from the appliance.
Figure 1B:
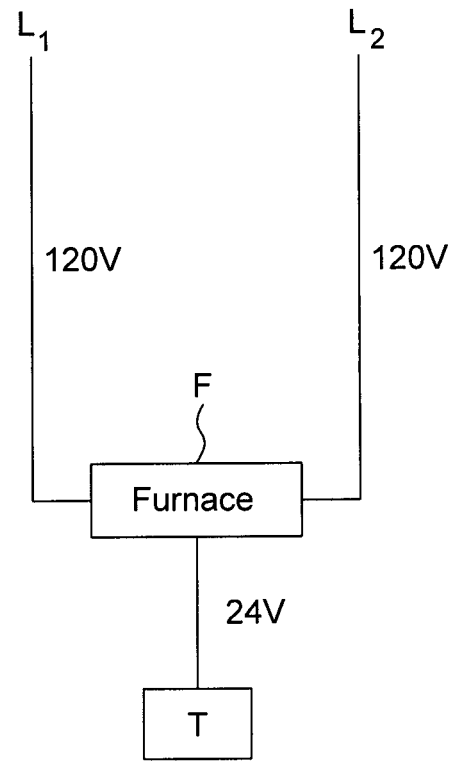
Figure 2A:
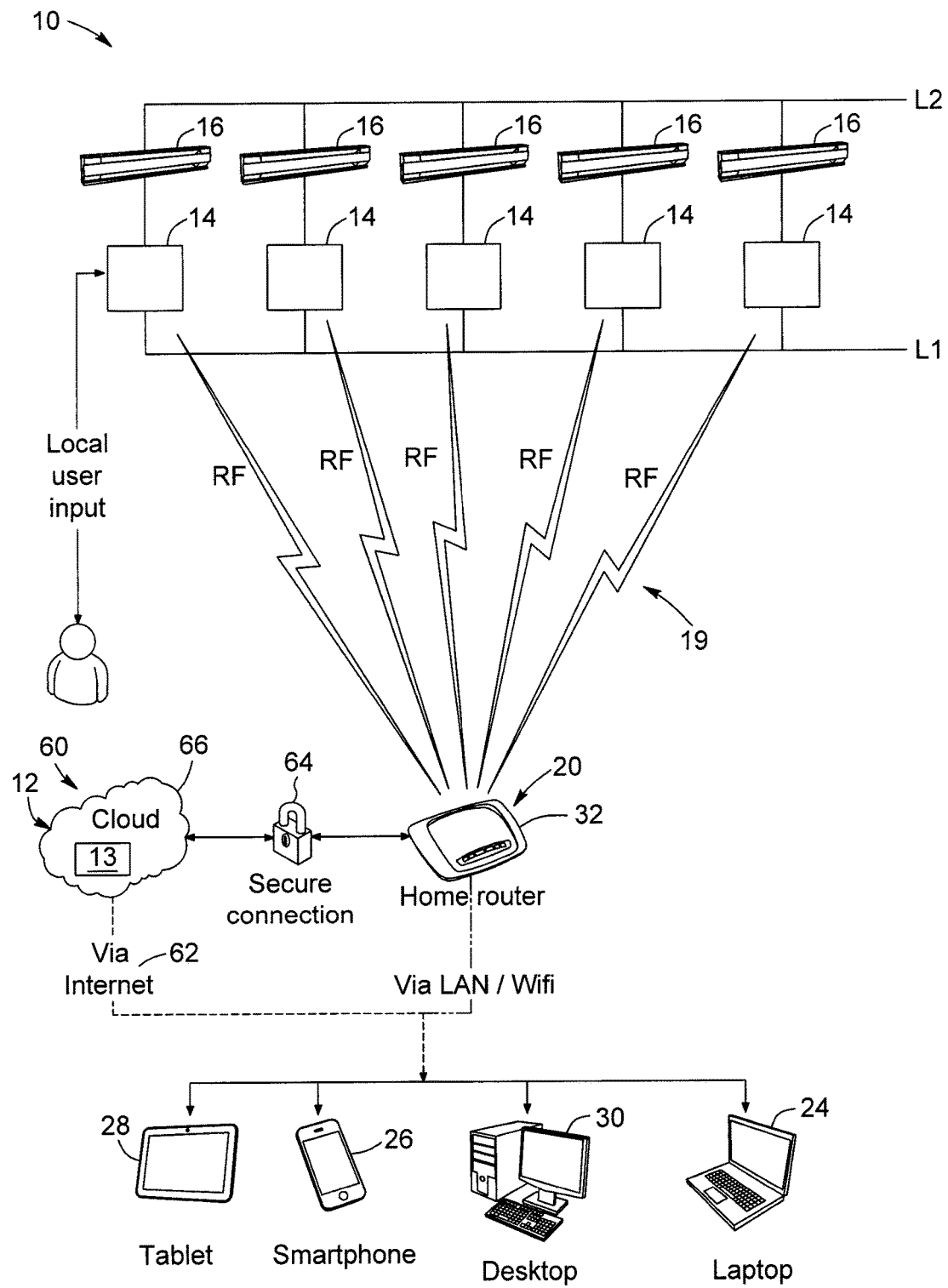
FIG. 2A is a schematic diagram showing a thermostat system, in accordance with an embodiment of the present invention.
Figure 3:
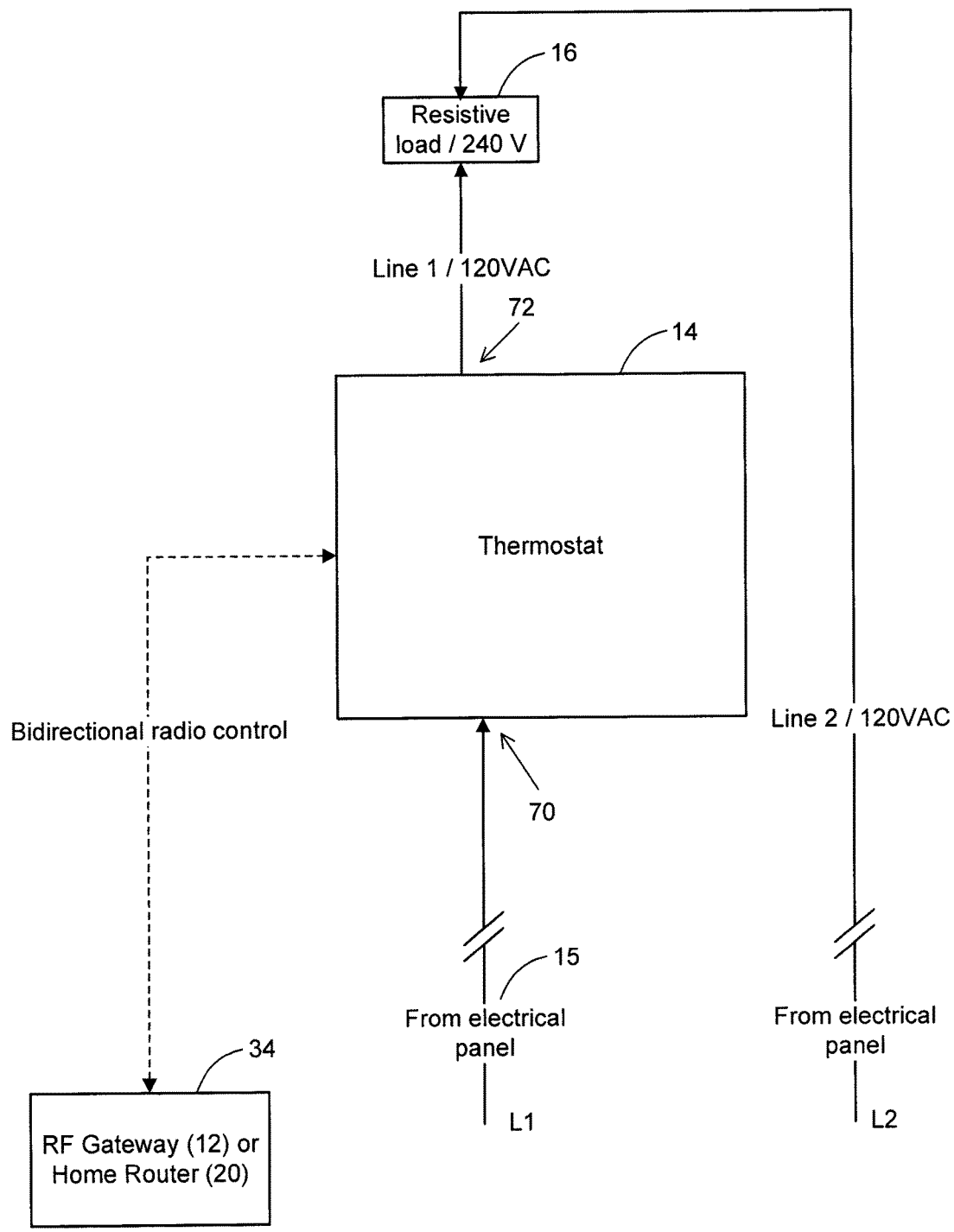
FIG. 3 is a schematic diagram showing a portion of the thermostat system shown in FIG. 2A or 2B.
Figure 5:
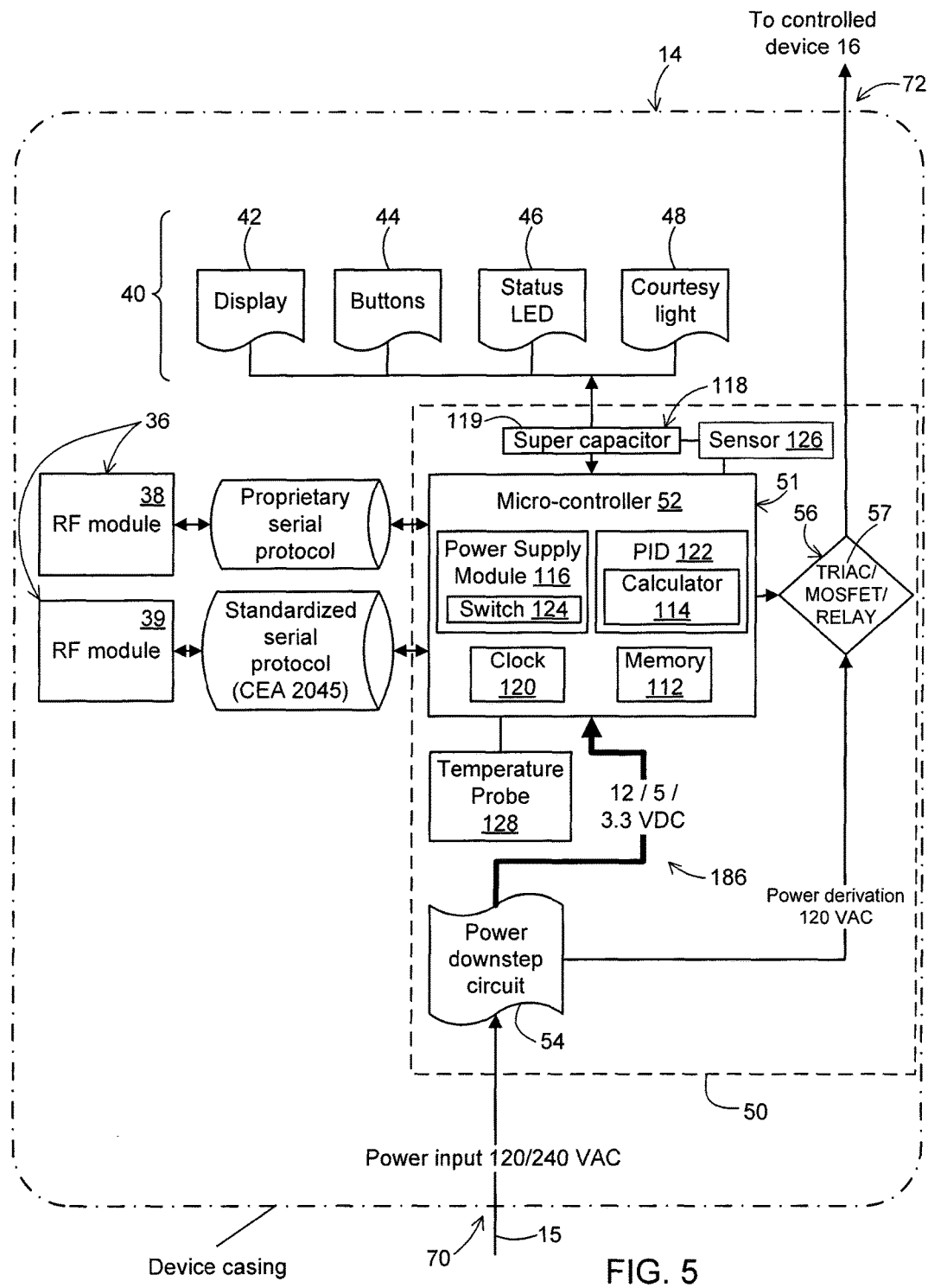
FIG. 5 is a schematic diagram showing components of a thermostat unit, in accordance with an embodiment.

As better illustrated in FIGS. 2A, 3, and 5, there is provided a thermostat system 10 comprising a central controller 12 integrated in a cloud based platform 66 (or cloud-based server), adapted to emit a control signal. The system 10 further comprises a plurality of thermostat units 14 adapted to receiving the control signal from the central controller 12 in order to control the supply of power fed from the thermostat unit 14 to resistive heaters (or resistive heating elements 16) in response to the control signal.

Figure 4A:
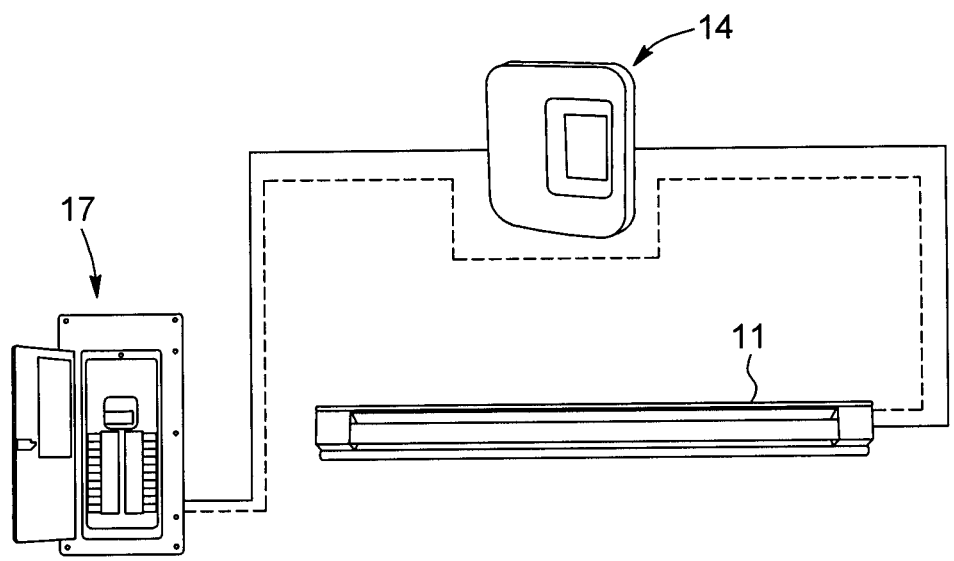
FIG. 4A is a schematic diagram showing a configuration of a thermostat unit connected to a heater and to a breaker panel, in accordance with an embodiment.
Figure 4B:
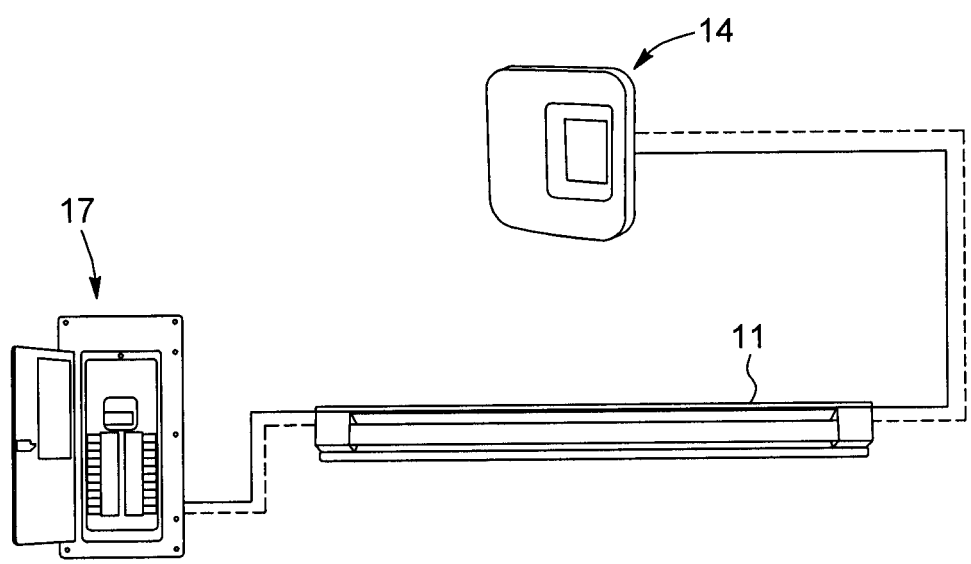
FIG. 4B is a schematic diagram showing a configuration of a thermostat unit connected to a heater and to a breaker panel, in accordance with another embodiment.

With reference to FIGS. 4A and 4B, the resistive heating element 16 may be provided in a resistive heater which may be a line-voltage resistive-type baseboard heater 11 and/or motor driven forced-air resistive heater (fanned air heater). The thermostat unit 14 may be connected in a line-to-line configuration (FIG. 4A), or in an in-line configuration (FIG. 4 B) in relation to the baseboard heater 11 and to a breaker panel 17.

Figure 6:
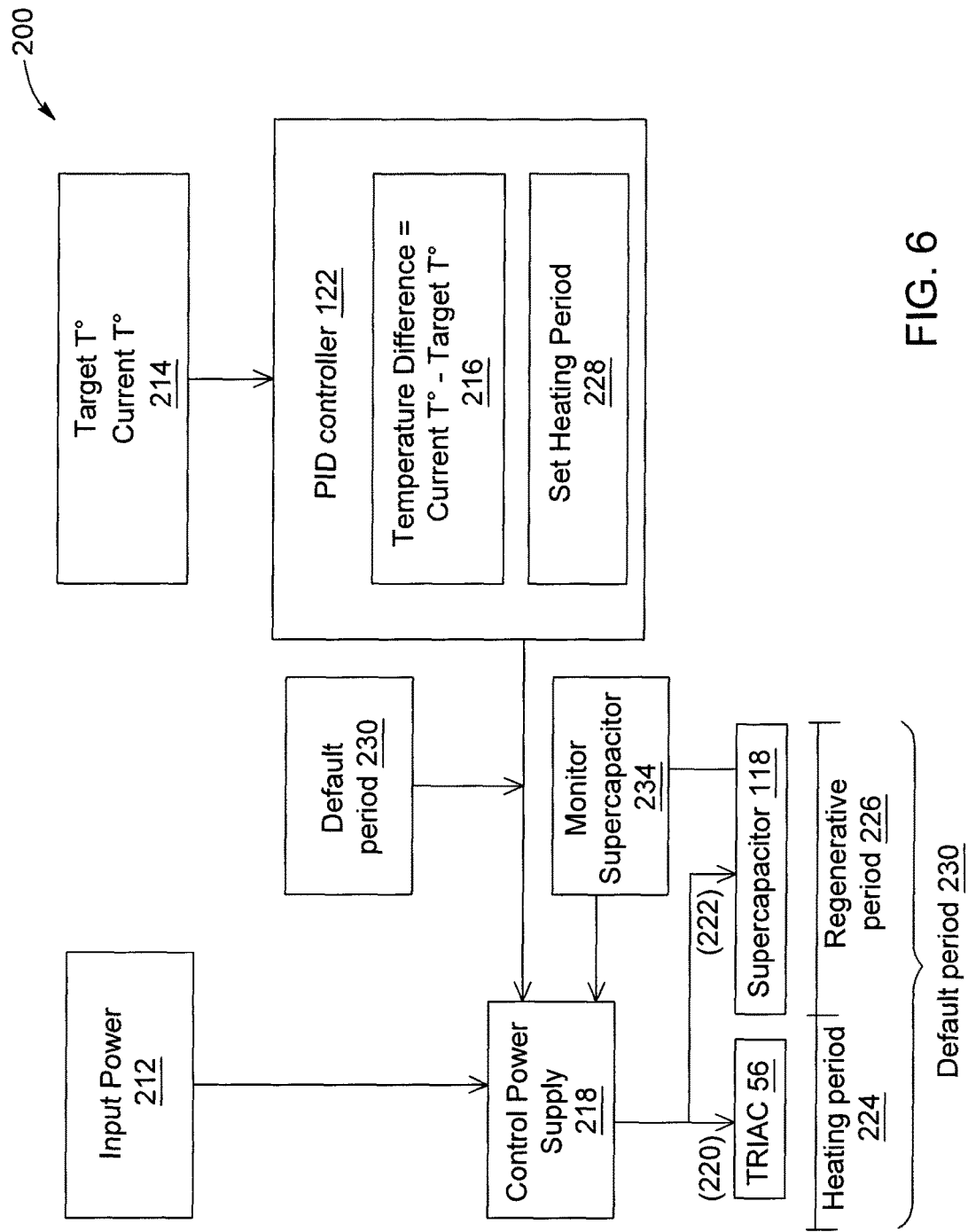
FIG. 6 is a schematic diagram showing a method for operation a thermostat unit, in accordance with an embodiment.
Figure 7:
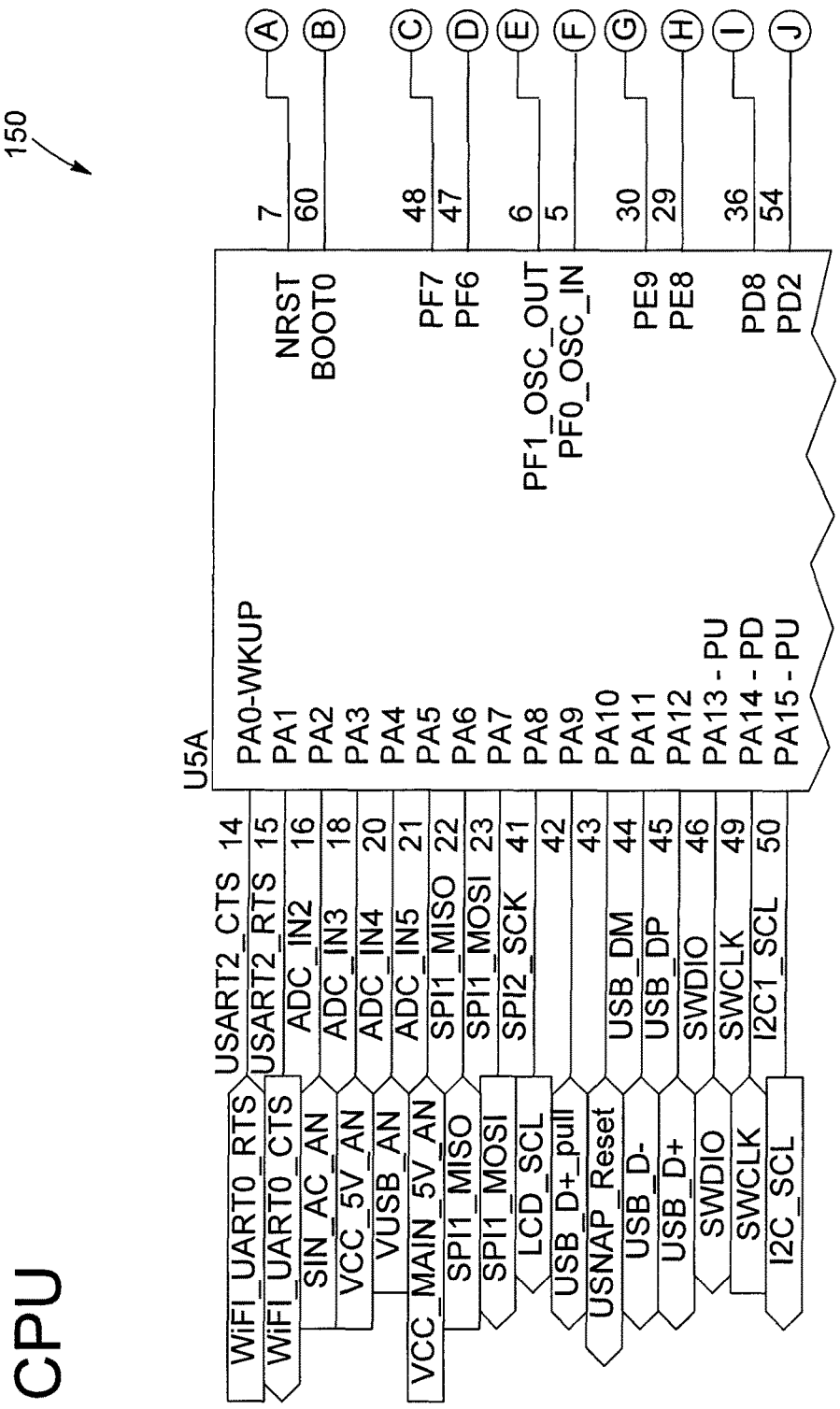
FIG. 7 is an electronic diagram of a central processor unit (CPU) of a thermostat unit, in accordance with an embodiment.
Figure 7:
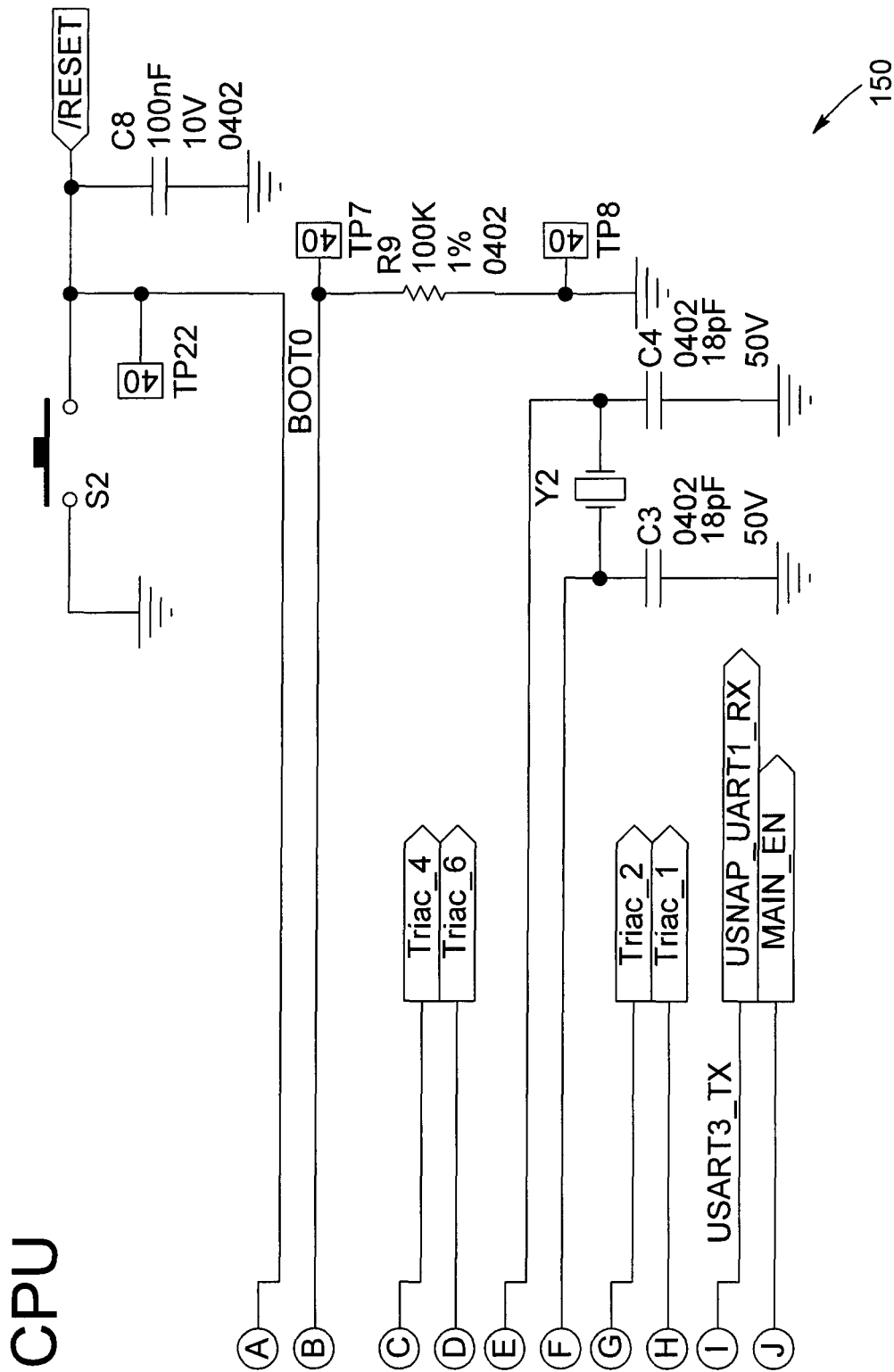
Figure 7:
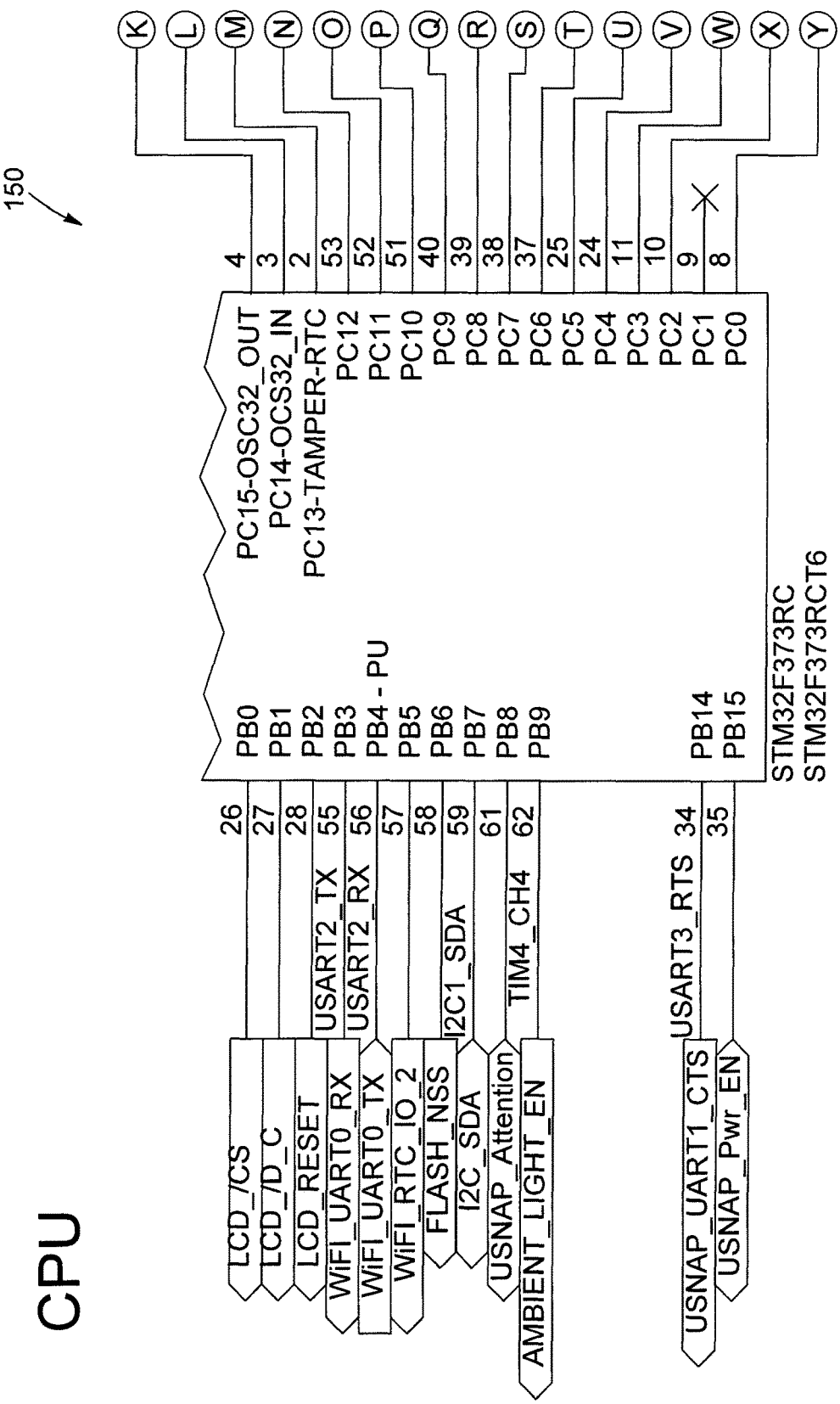
Figure 7:
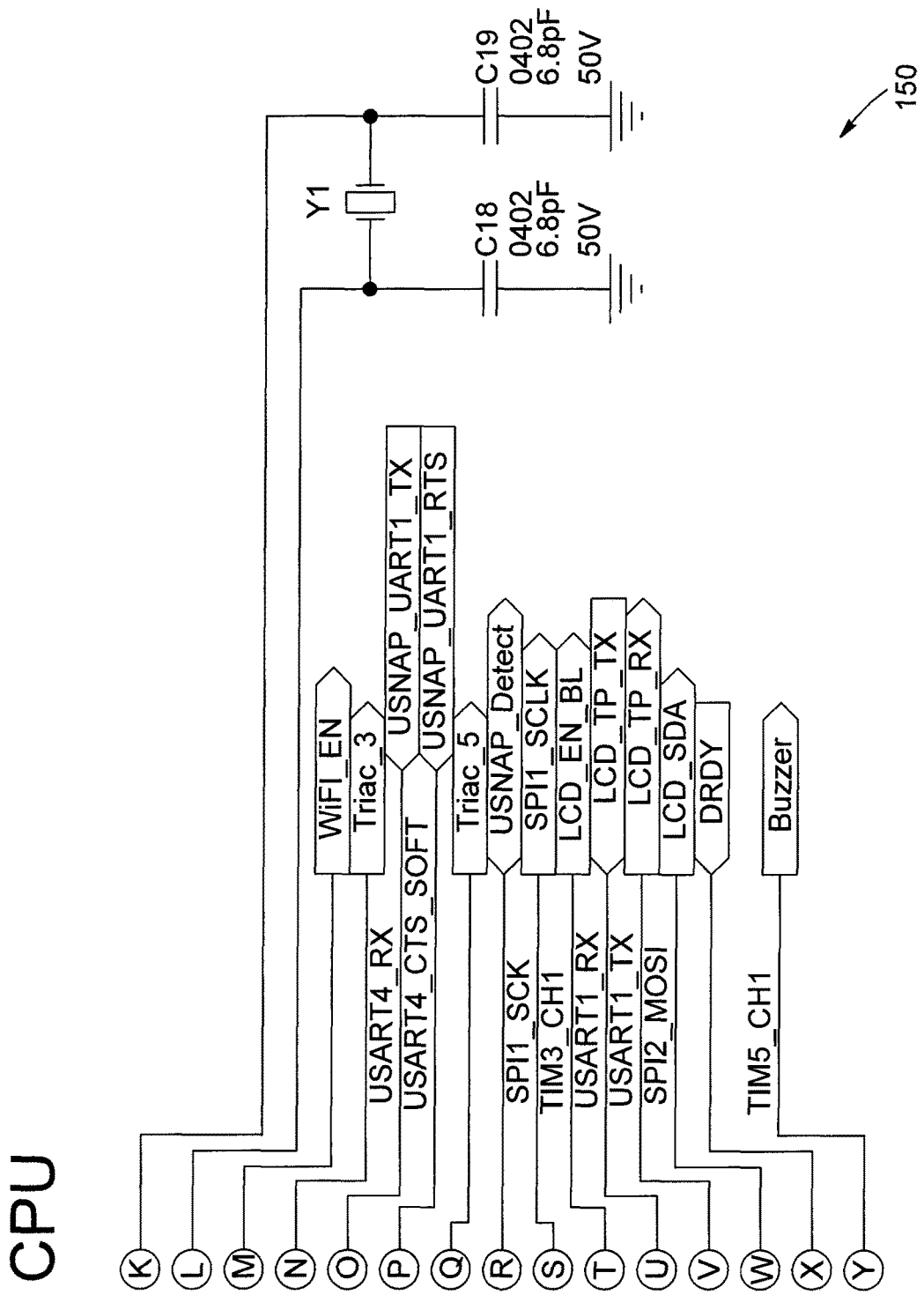
Figure 8:
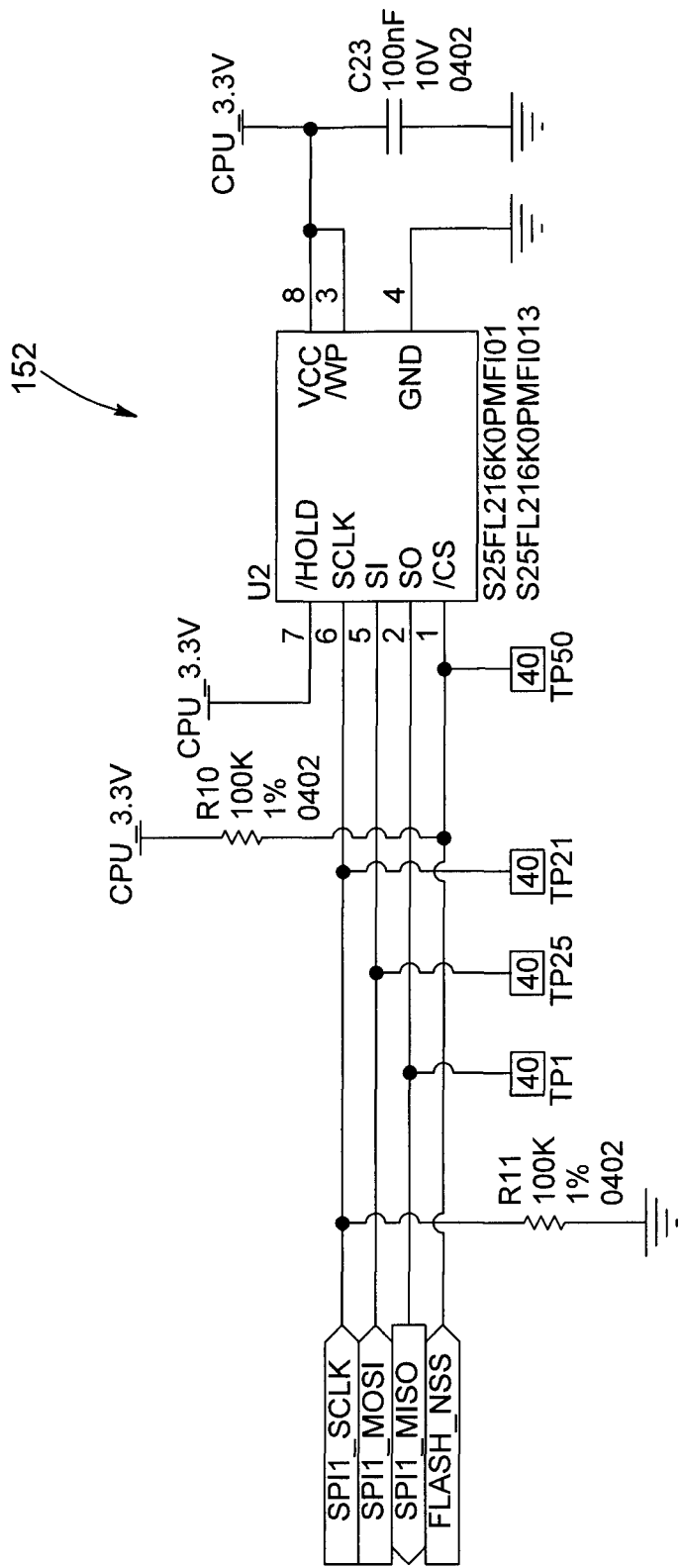
FIG. 8 is an electronic diagram of a flash memory component of a thermostat unit, in accordance with an embodiment.
Figure 9:
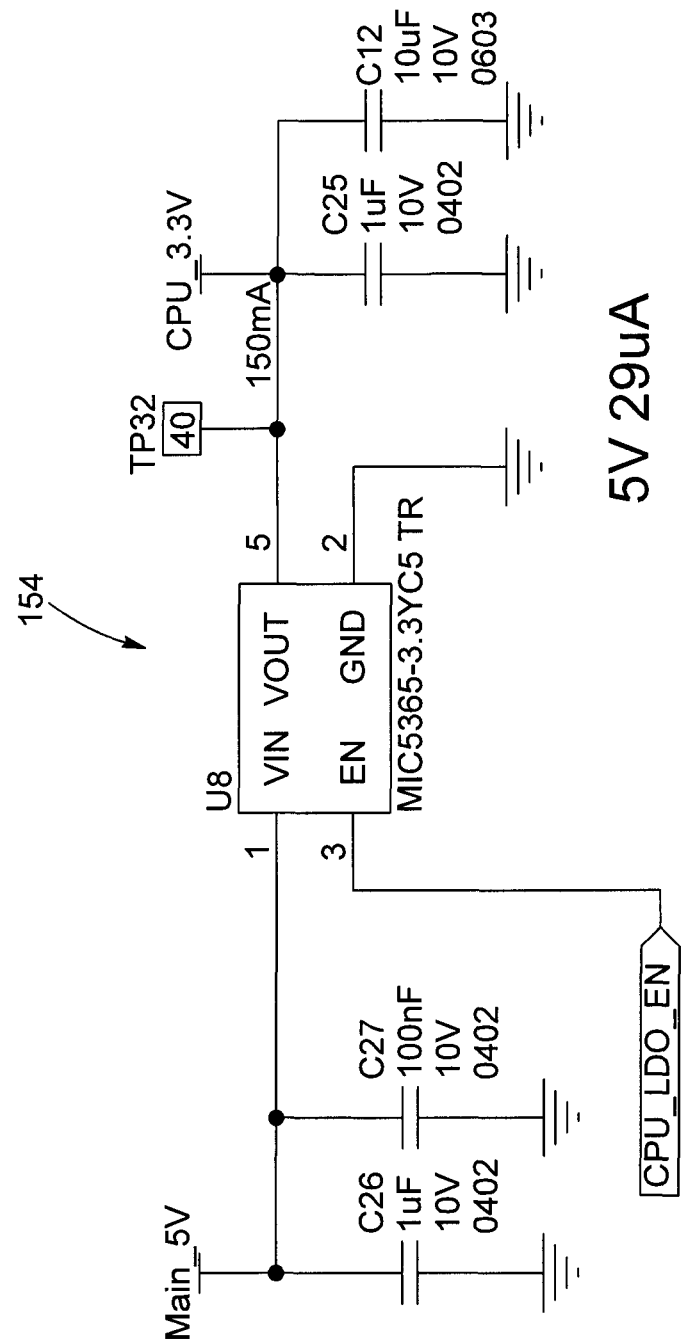
FIG. 9 is an electronic diagram of a CPU Low-DropOut (LDO) regulator component of a thermostat unit, in accordance with an embodiment.
Figure 10:
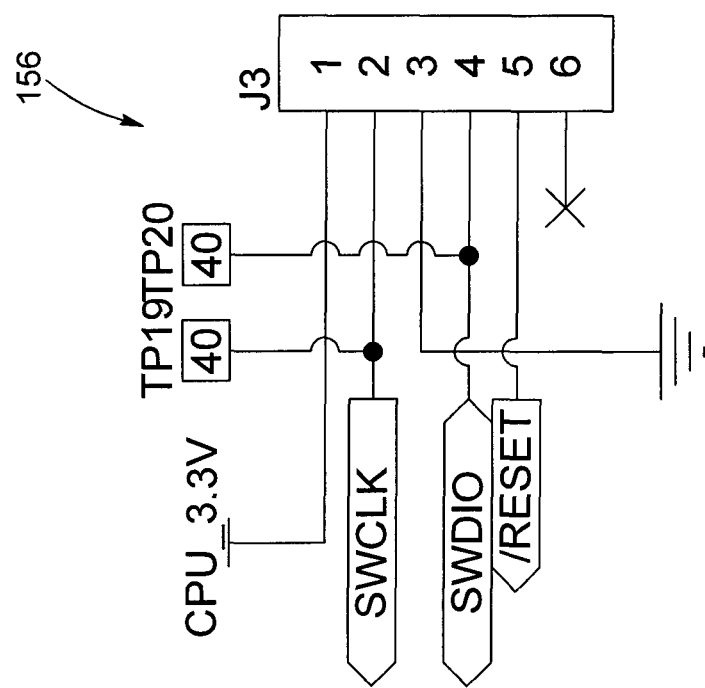
FIG. 10 is an electronic diagram of a Serial Wire Debug (SWD) component of a thermostat unit, in accordance with an embodiment.
Figure 11:
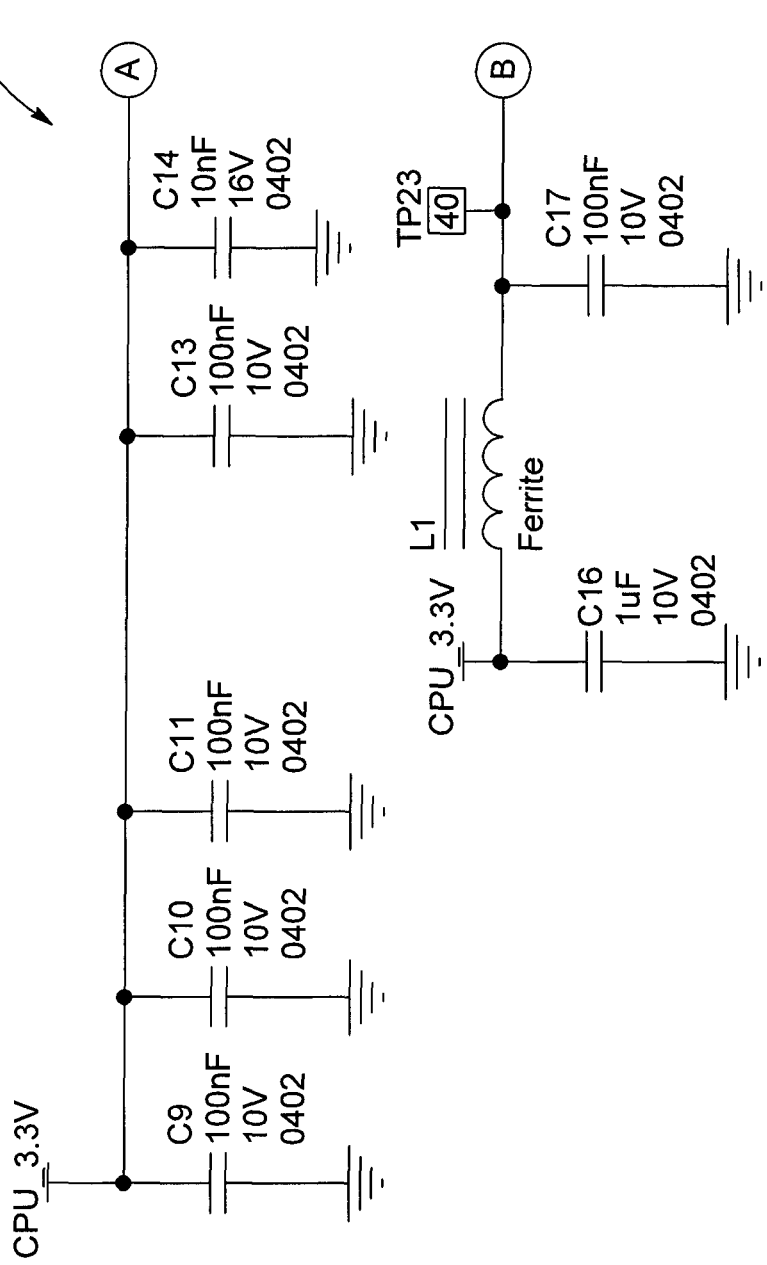
FIG. 11 is an electronic diagram of a CPU supply and decoupling component of a thermostat unit, in accordance with an embodiment.
Figure 11:
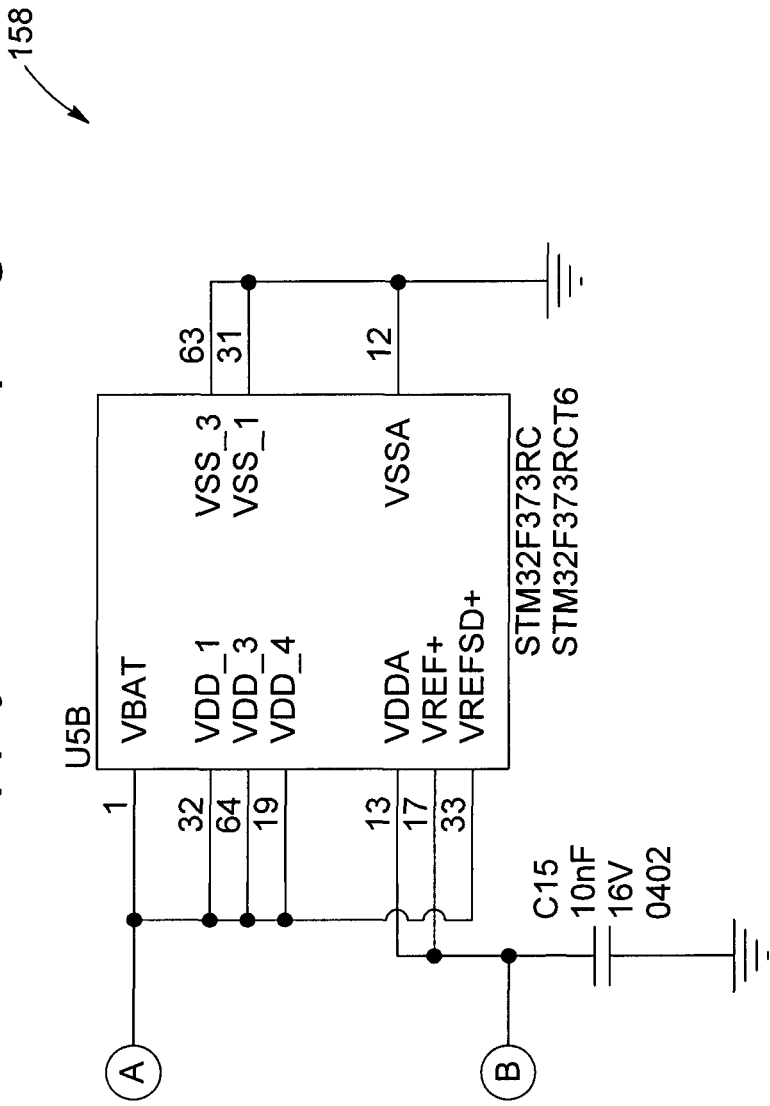
Figure 12:
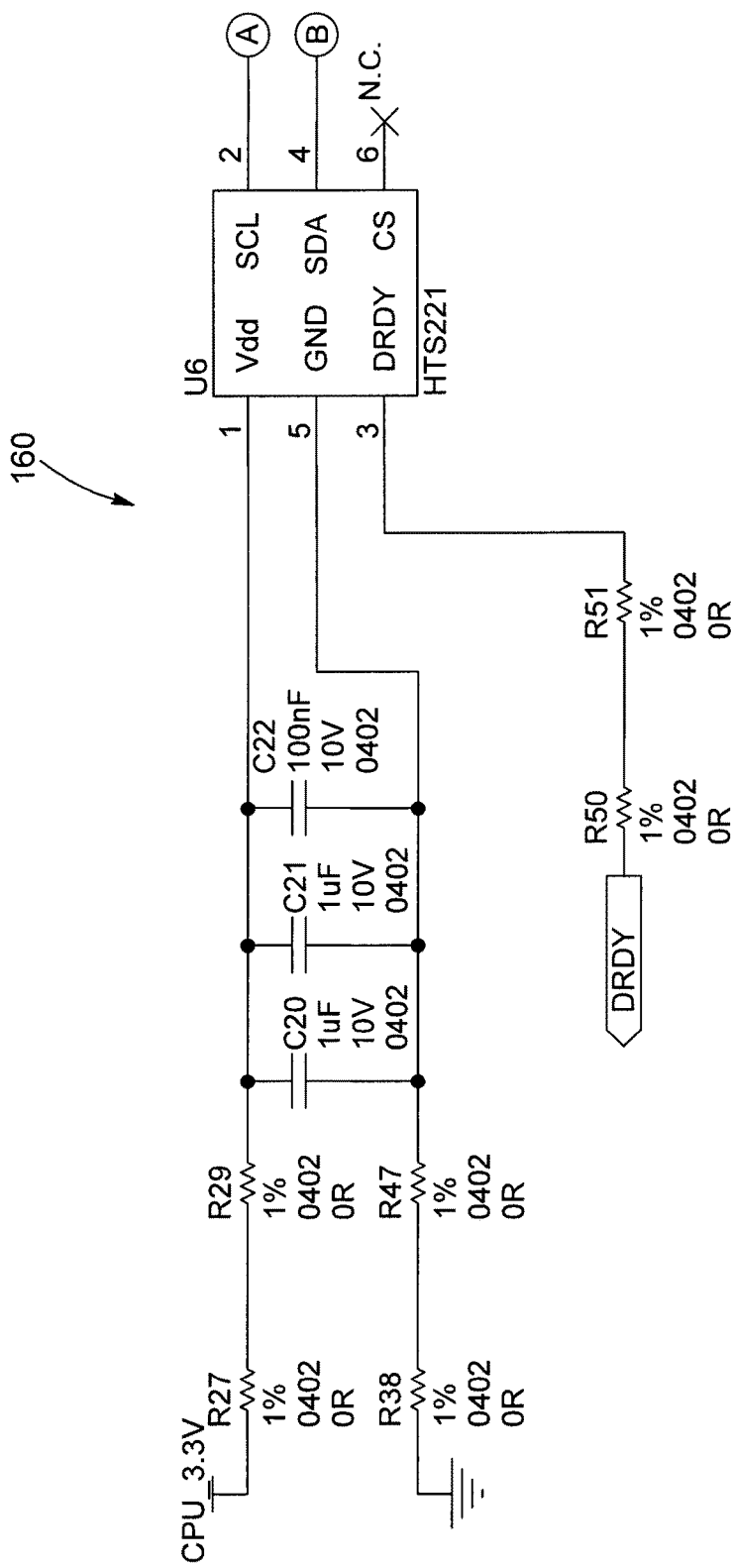
FIG. 12 is an electronic diagram of a temperature and humidity sensor component of a thermostat unit, in accordance with an embodiment.
Figure 12:
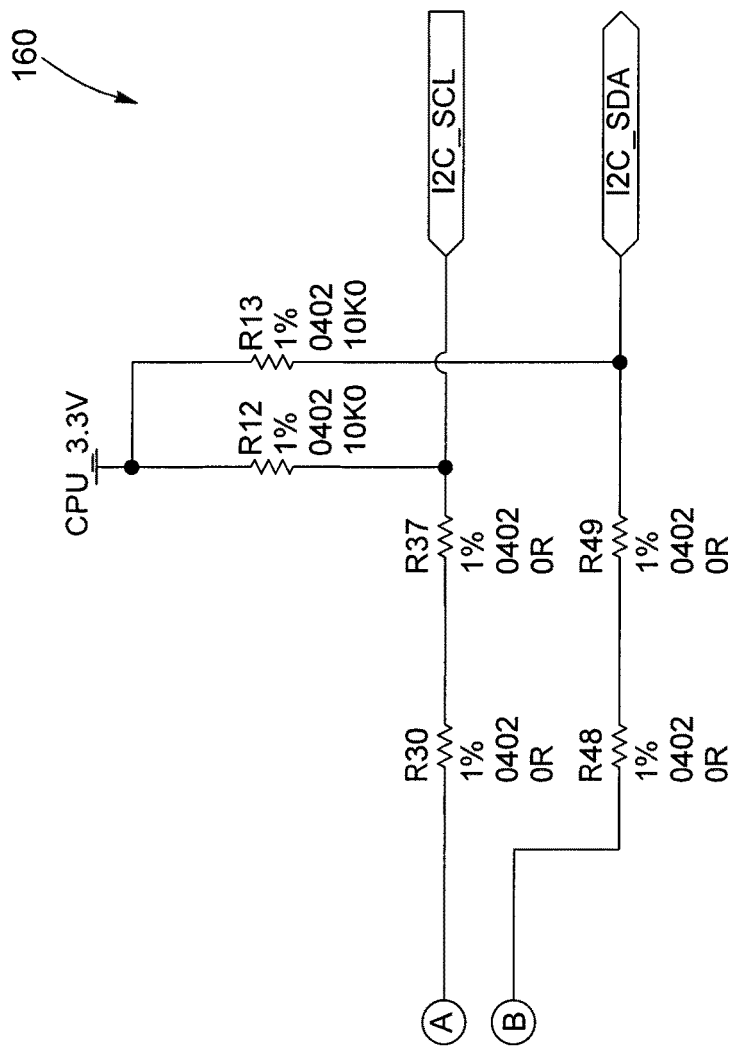
Figure 13:
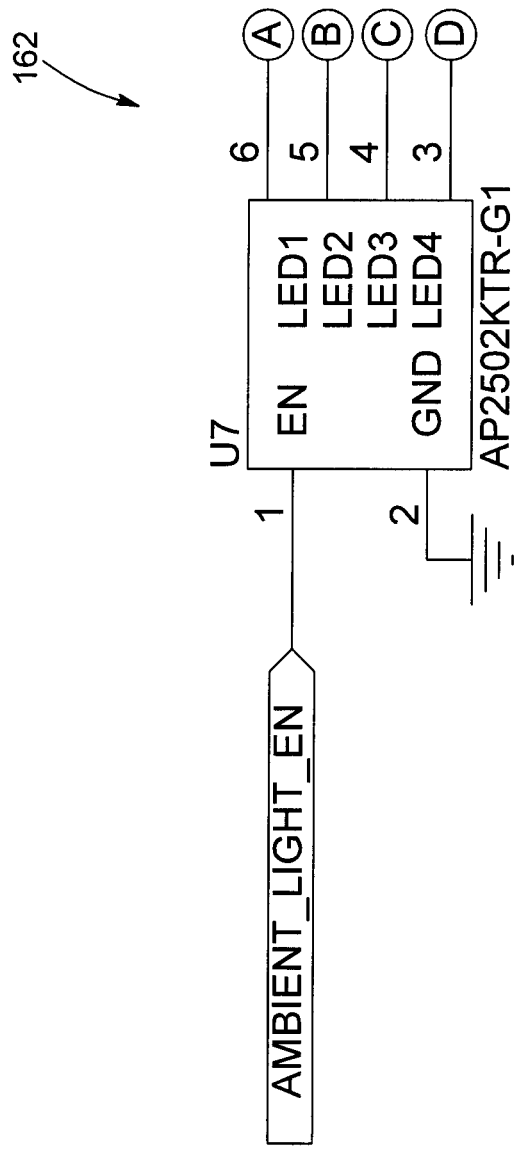
FIG. 13 is an electronic diagram of an ambient light control component of a thermostat unit, in accordance with an embodiment.
Figure 14:
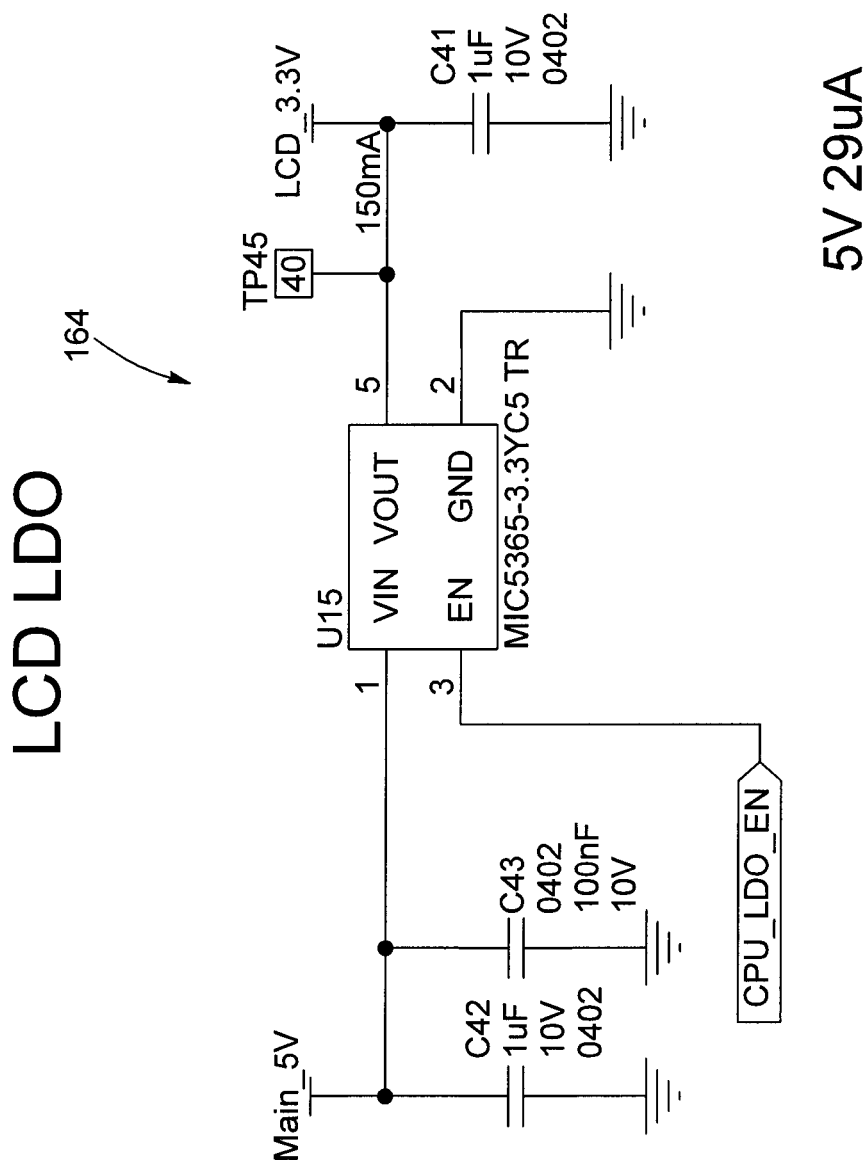
FIG. 14 is an electronic diagram of a liquid-crystal-display (LCD) LDO component of a thermostat unit, in accordance with an embodiment.
Figure 15:
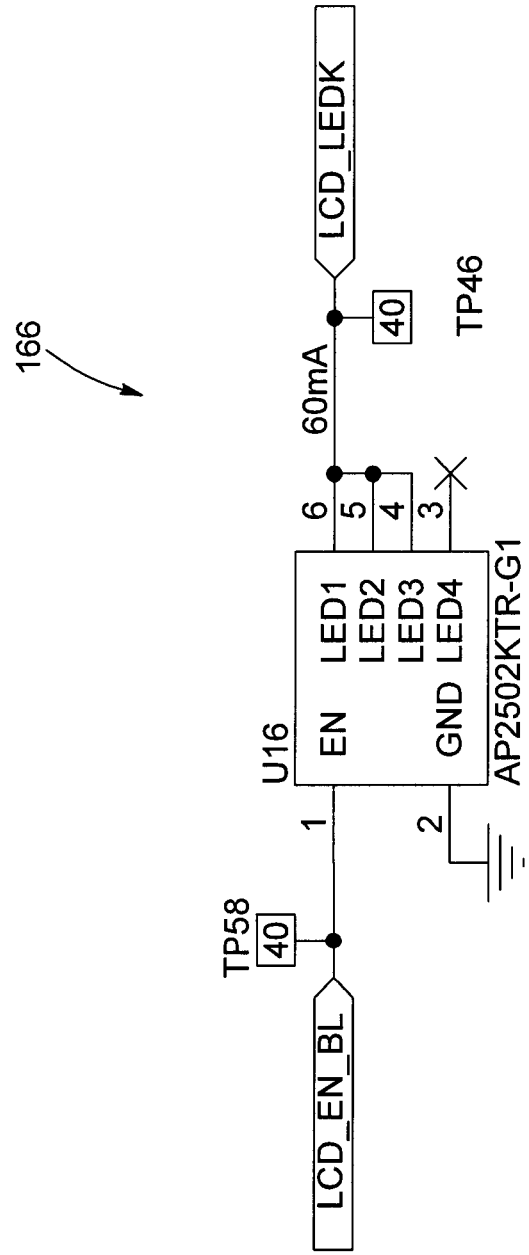
FIG. 15 is an electronic diagram of an LCD backlight control component of a thermostat unit, in accordance with an embodiment.
Figure 16:
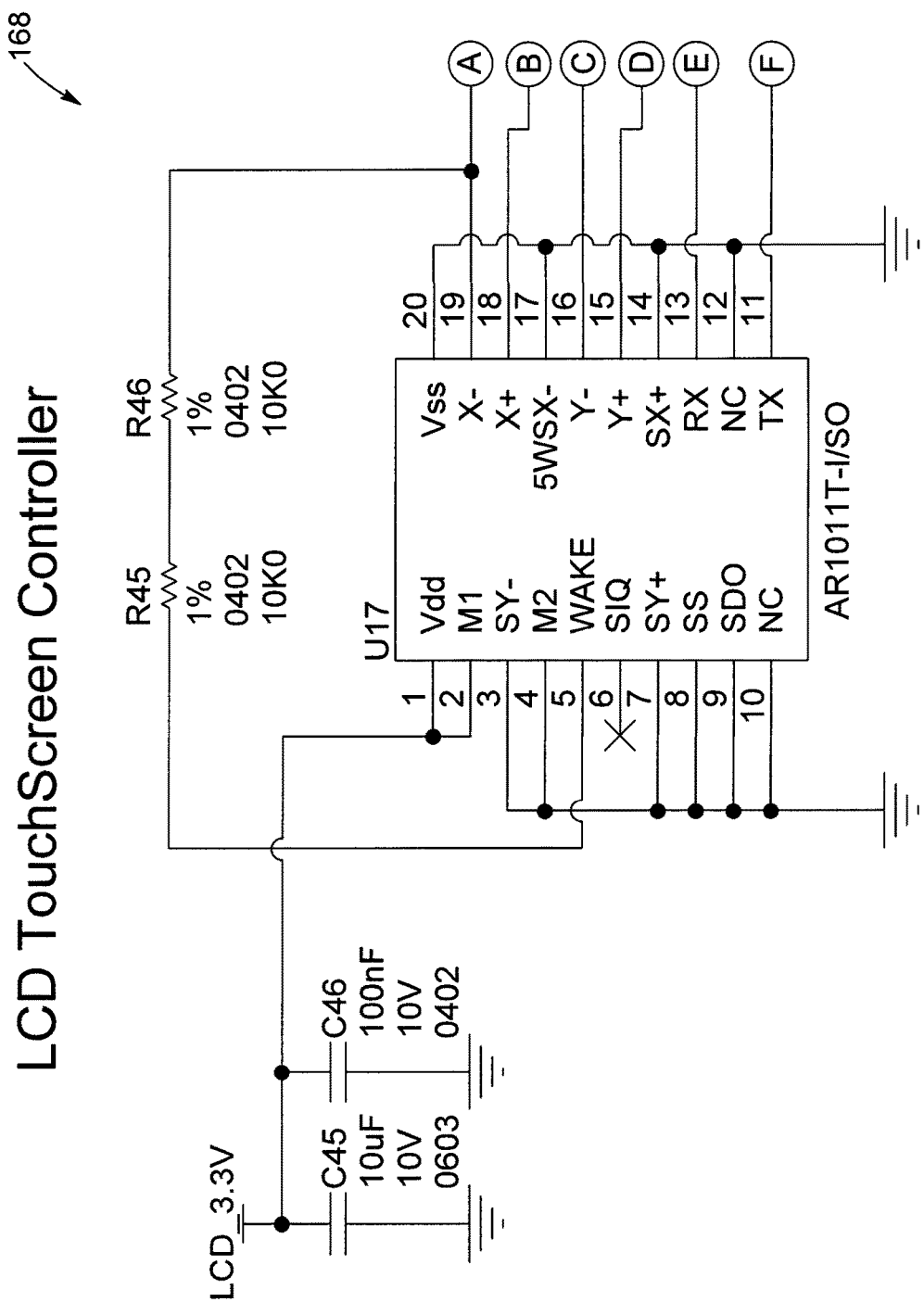
FIG. 16 is an electronic diagram of an LCD touchscreen controller component of a thermostat unit, in accordance with an embodiment.
Figure 16:
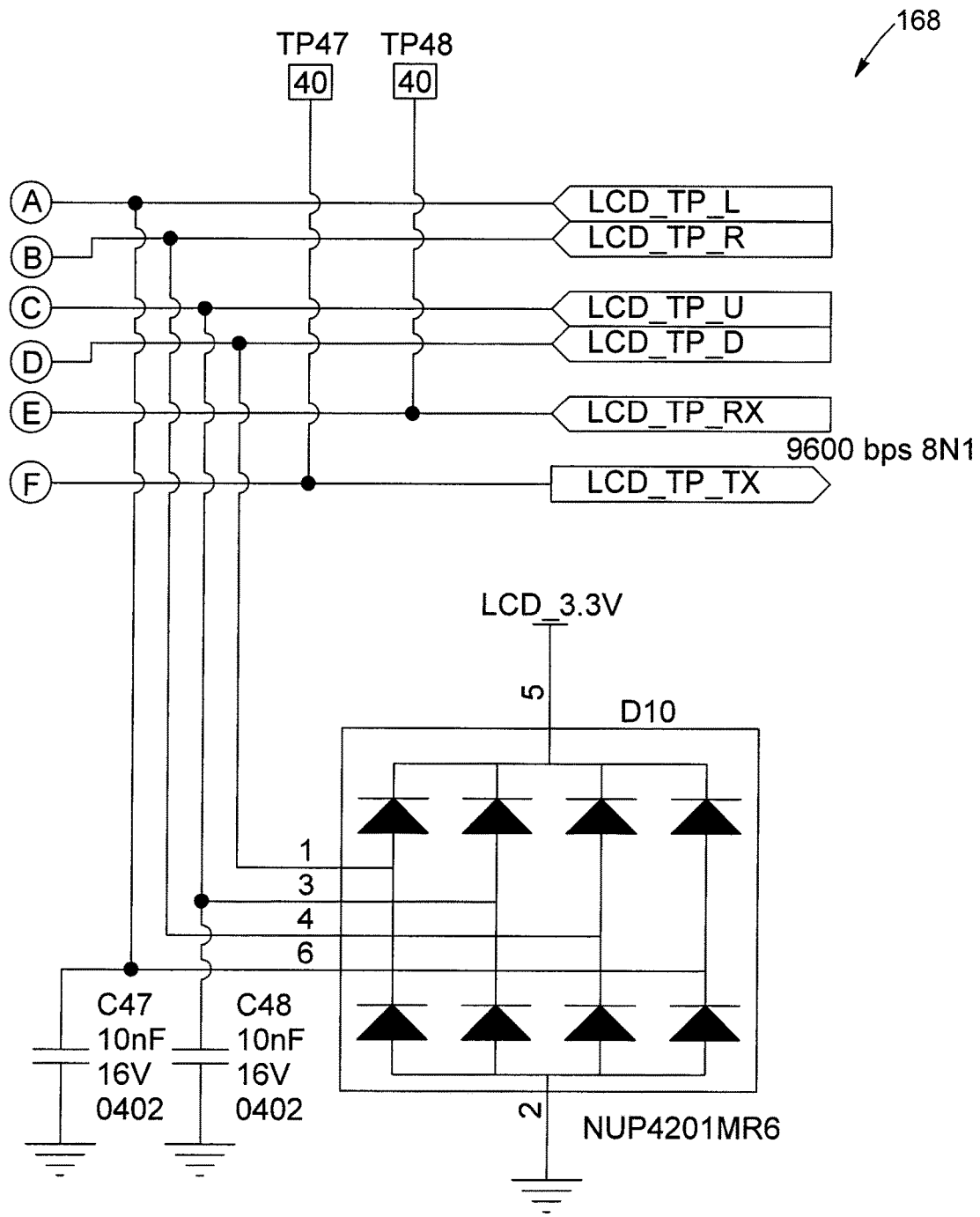
Figure 17:
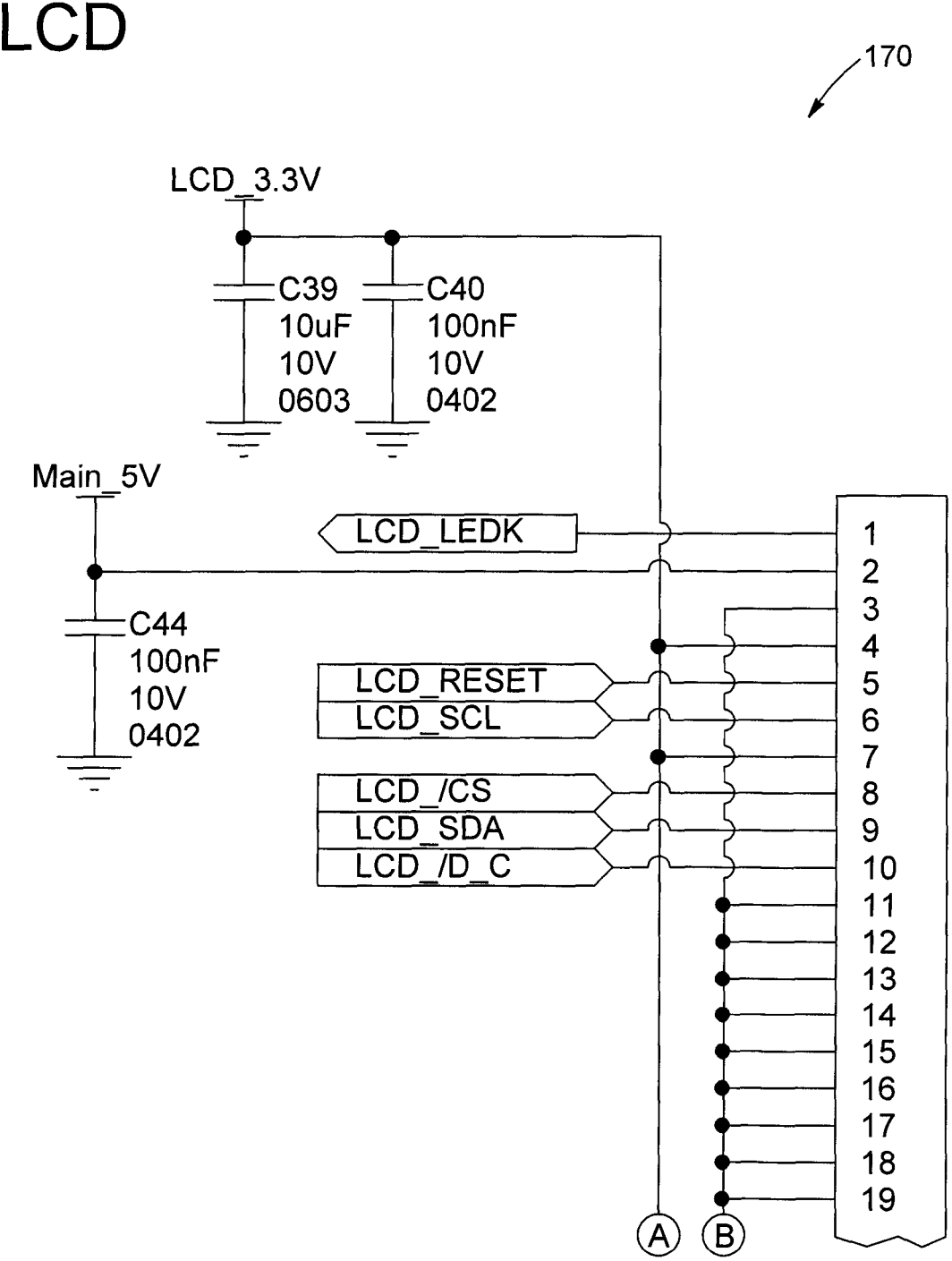
FIG. 17 is an electronic diagram of an LCD component of a thermostat unit, in accordance with an embodiment.
Figure 17:
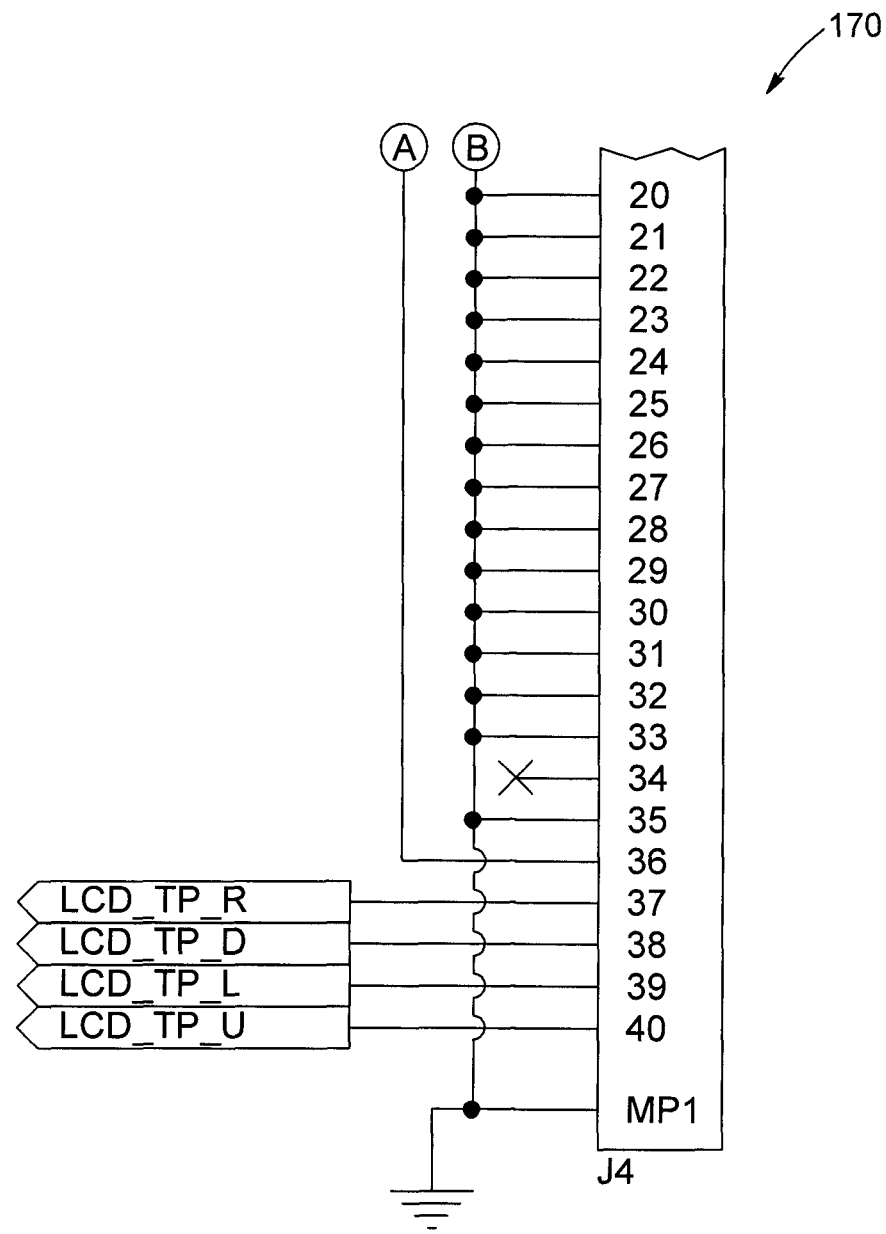
Figure 18:
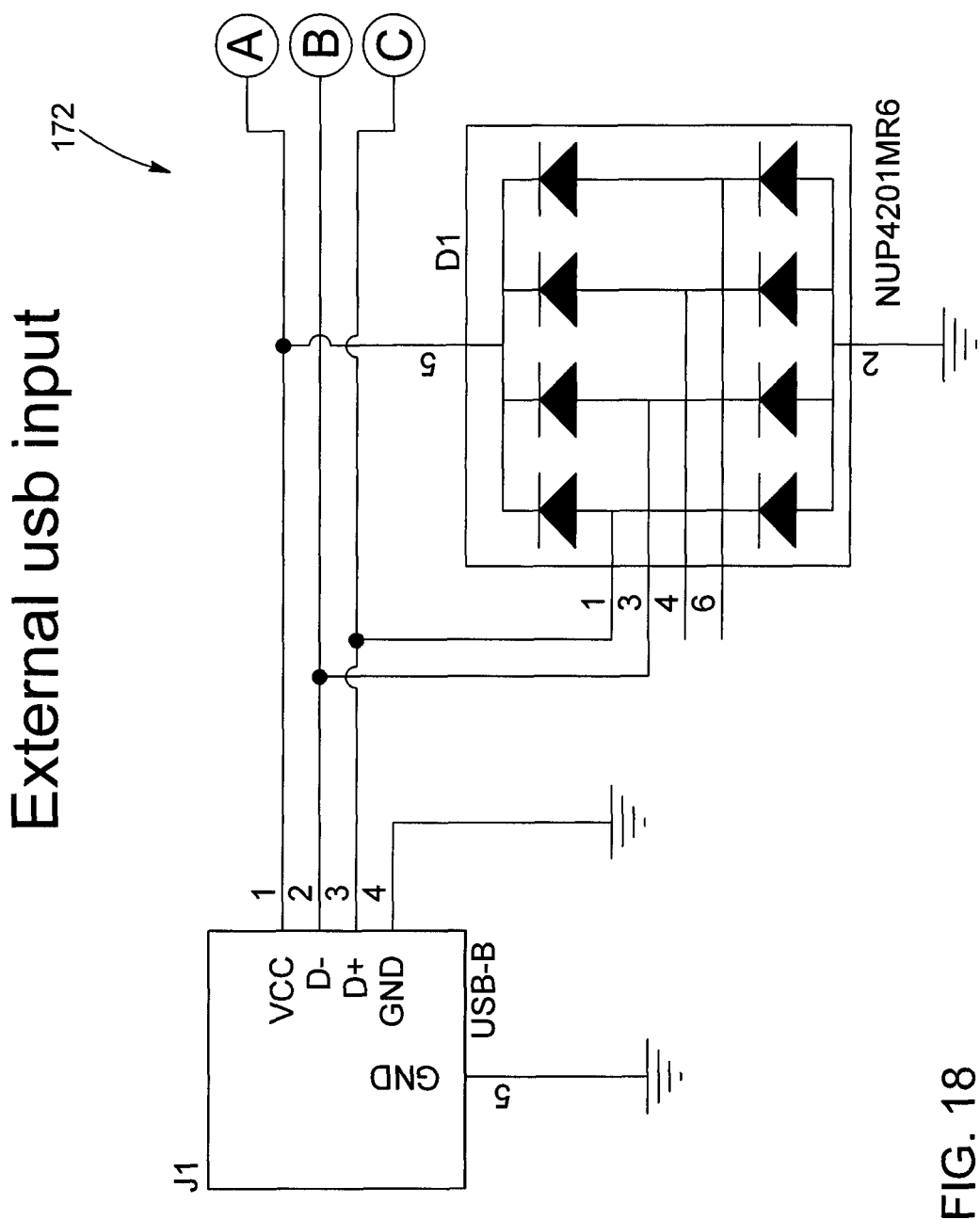
FIG. 18 is an electronic diagram of an external universal serial bus (USB) input component of a thermostat unit, in accordance with an embodiment.
Figure 18:
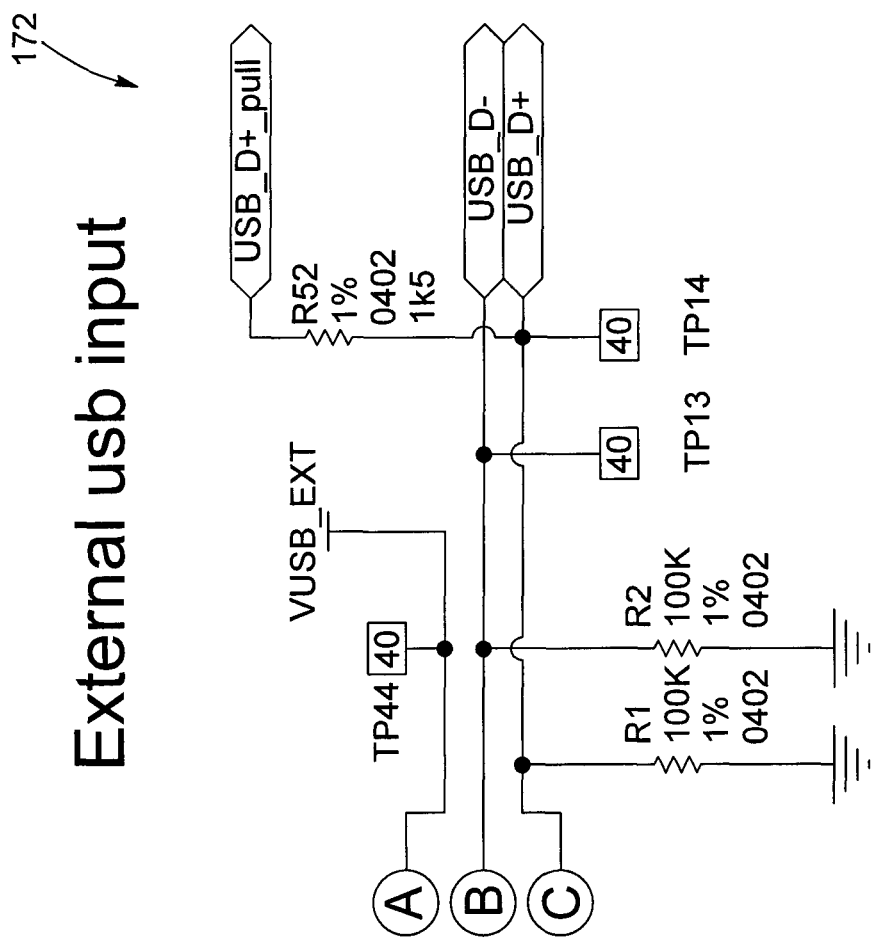
Figure 19:
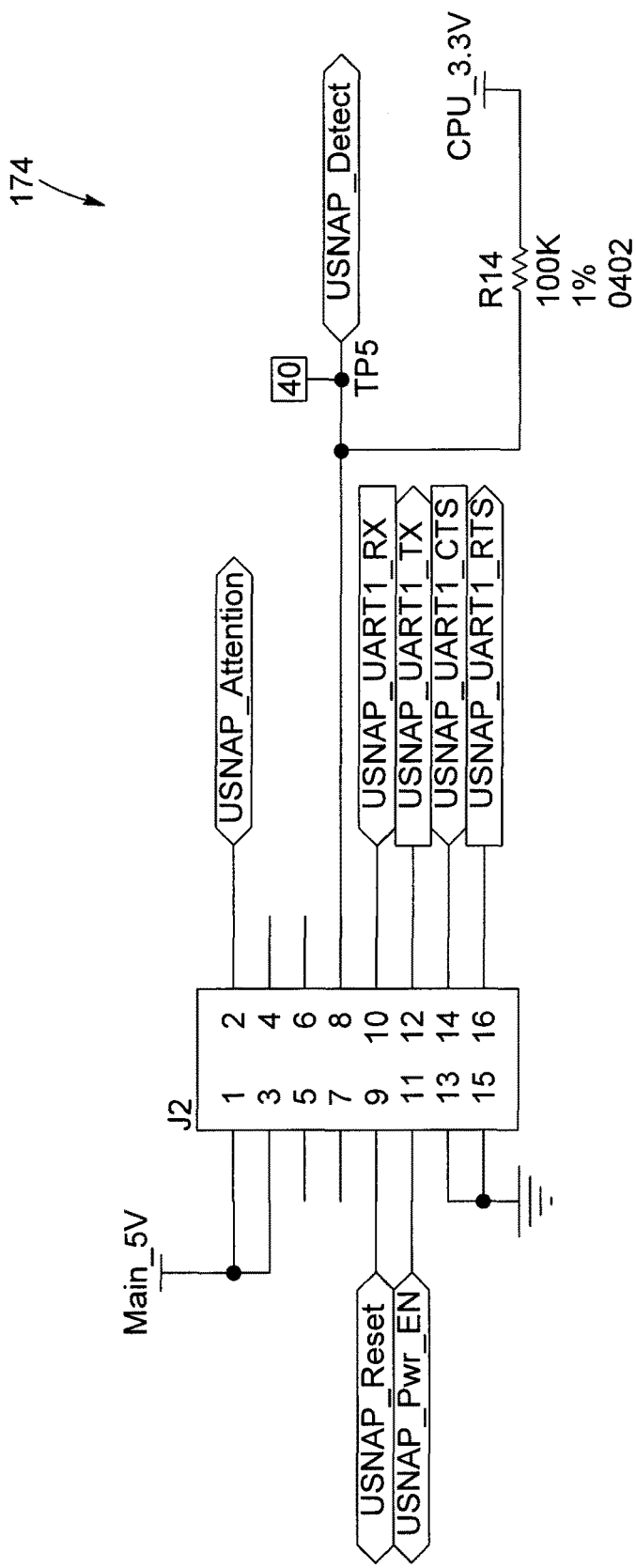
FIG. 19 is an electronic diagram of a universal smart network access port (USNAP) connector adapter input component of a thermostat unit, in accordance with an embodiment.
Figure 19:
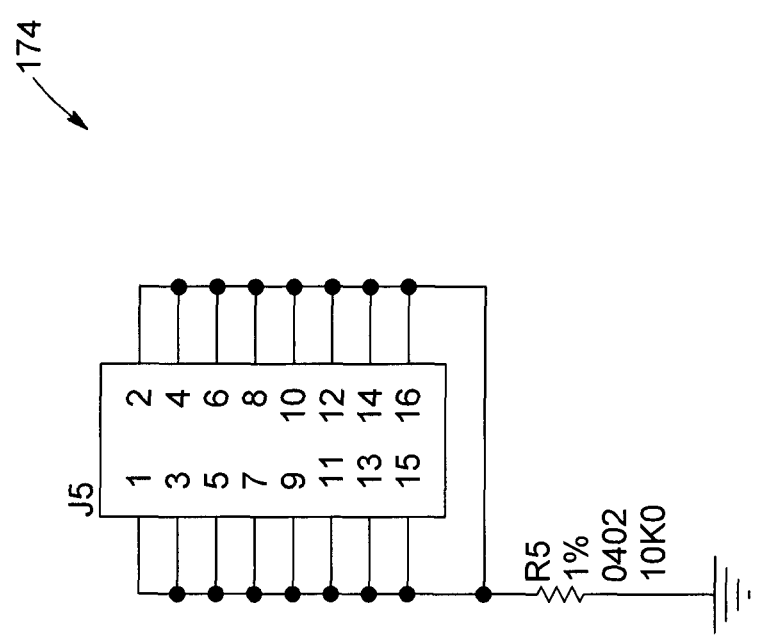
Figure 20:
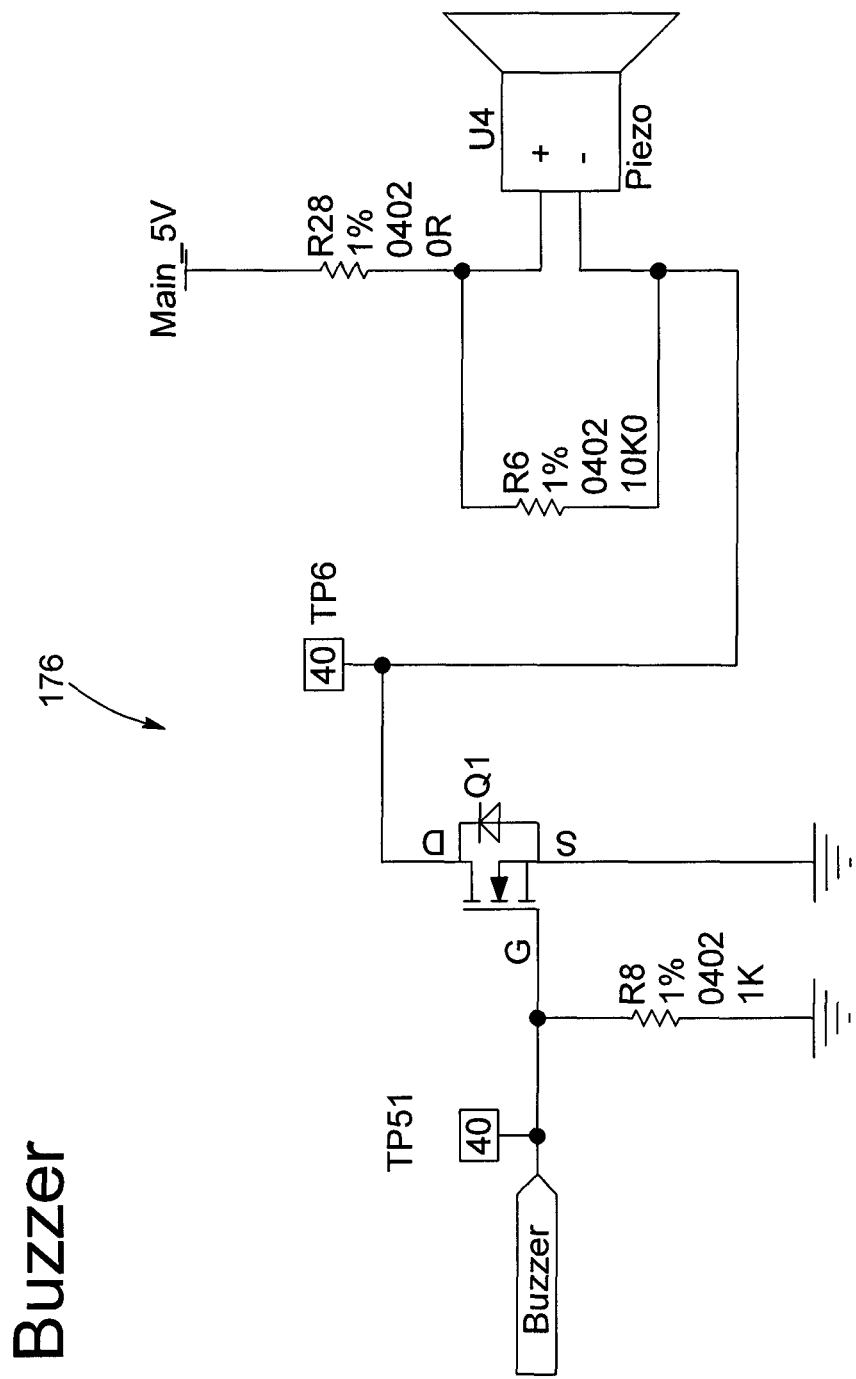
FIG. 20 is an electronic diagram of a buzzer component of a thermostat unit, in accordance with an embodiment.
Figure 21:
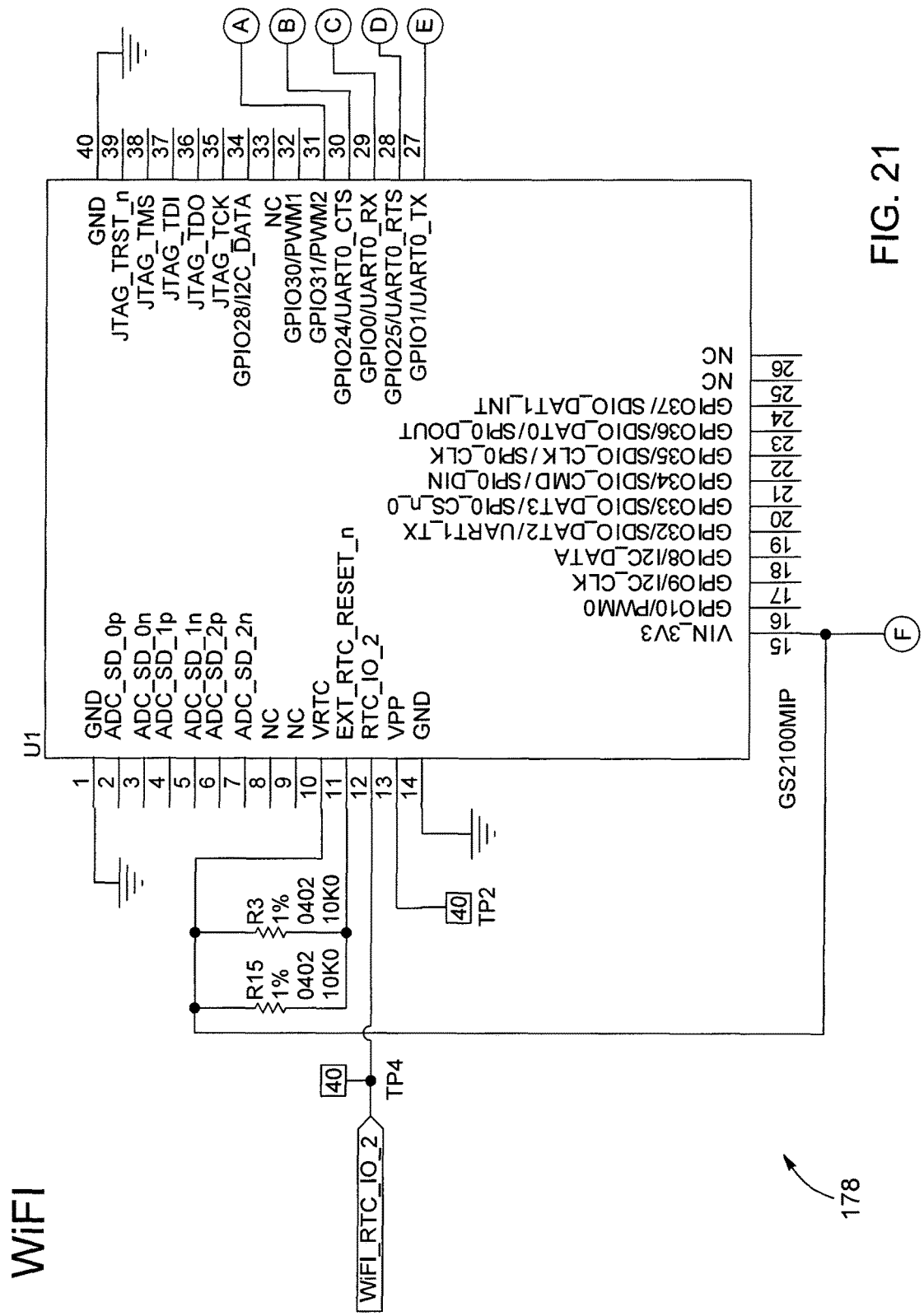
FIG. 21 is an electronic diagram of Wifi component of a thermostat unit, in accordance with an embodiment.
Figure 21:
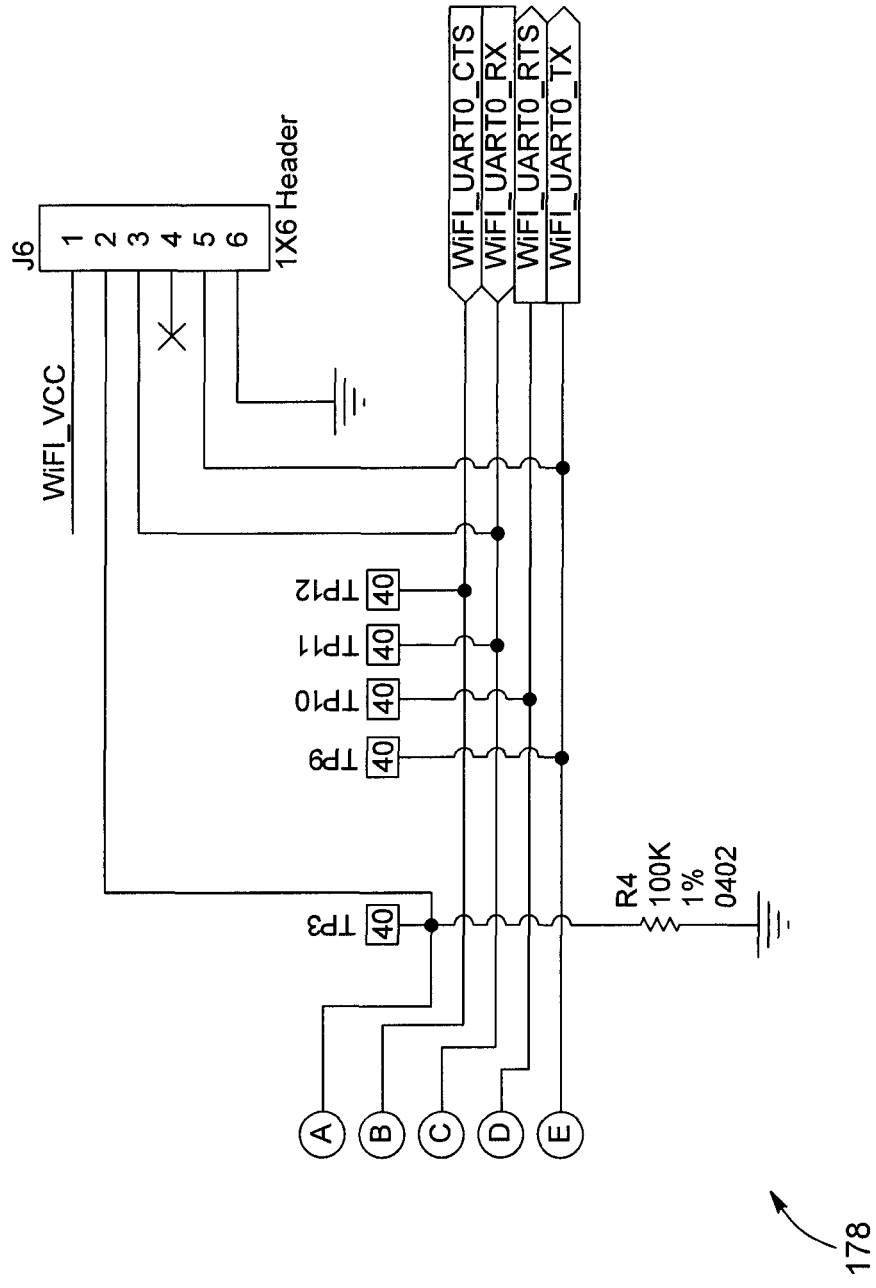
Figure 21:
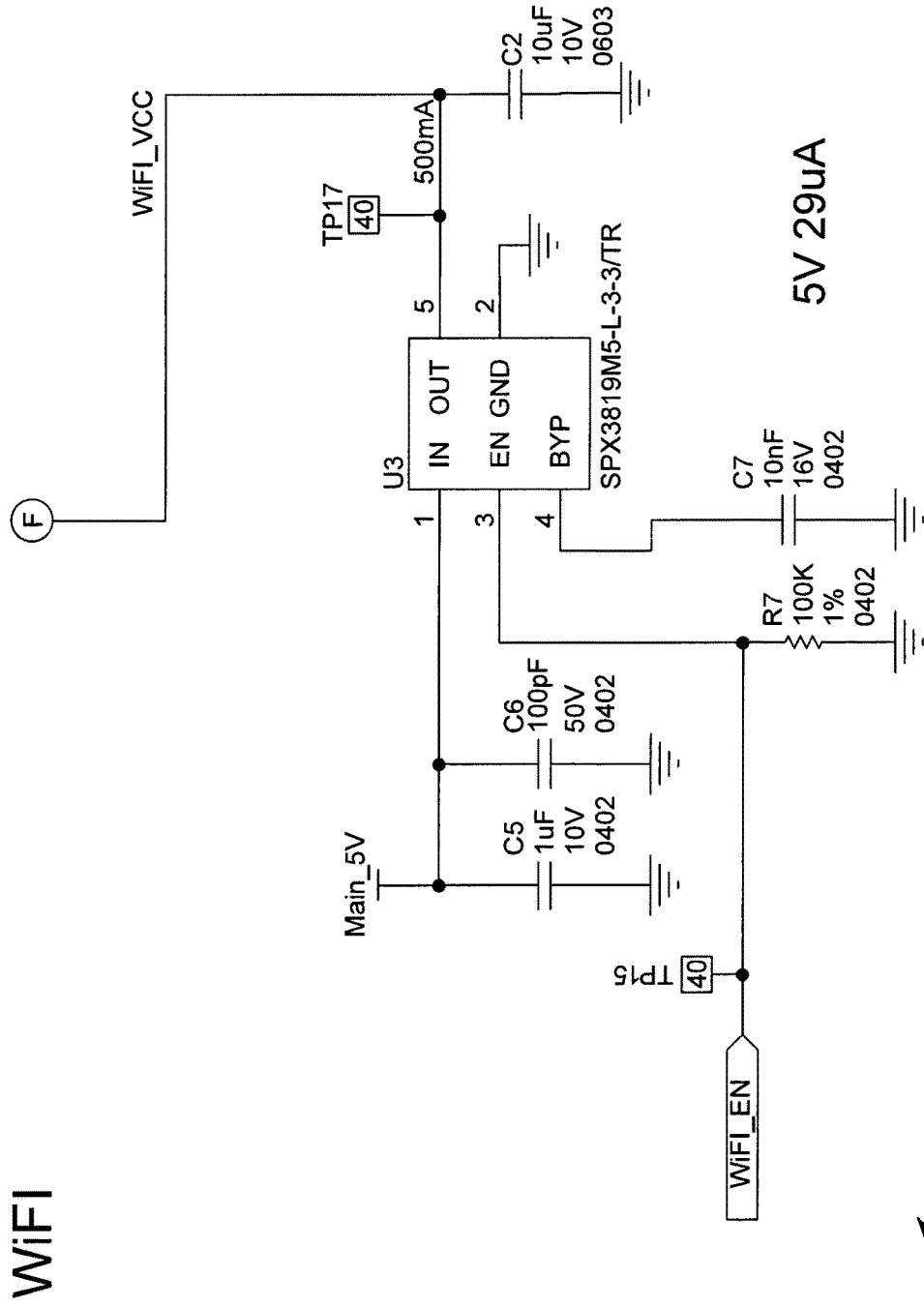
Figure 22:
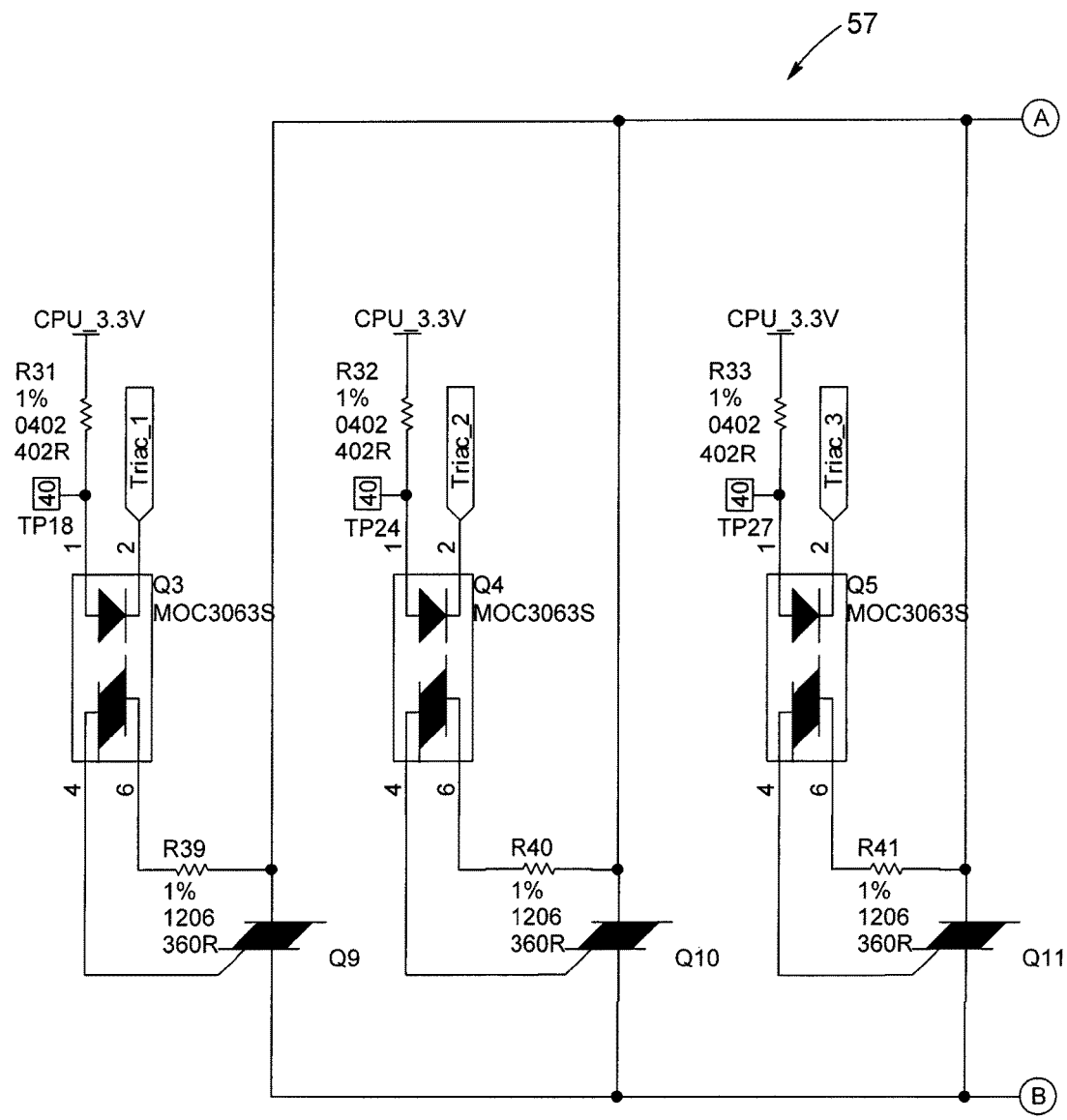
FIG. 22 is an electronic diagram of a TRIAC assembly component of a thermostat unit, in accordance with an embodiment.
Figure 22:
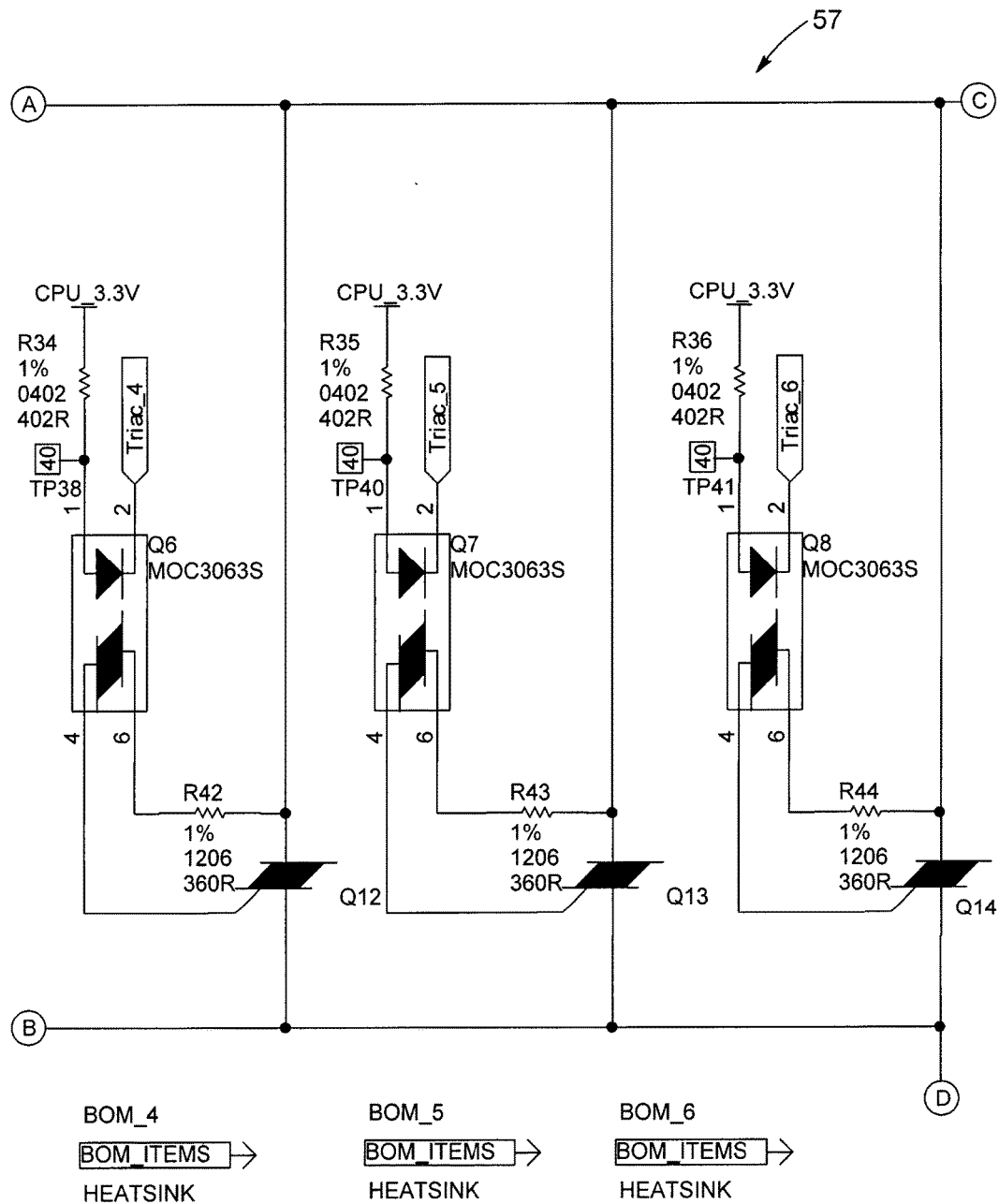
Figure 22:
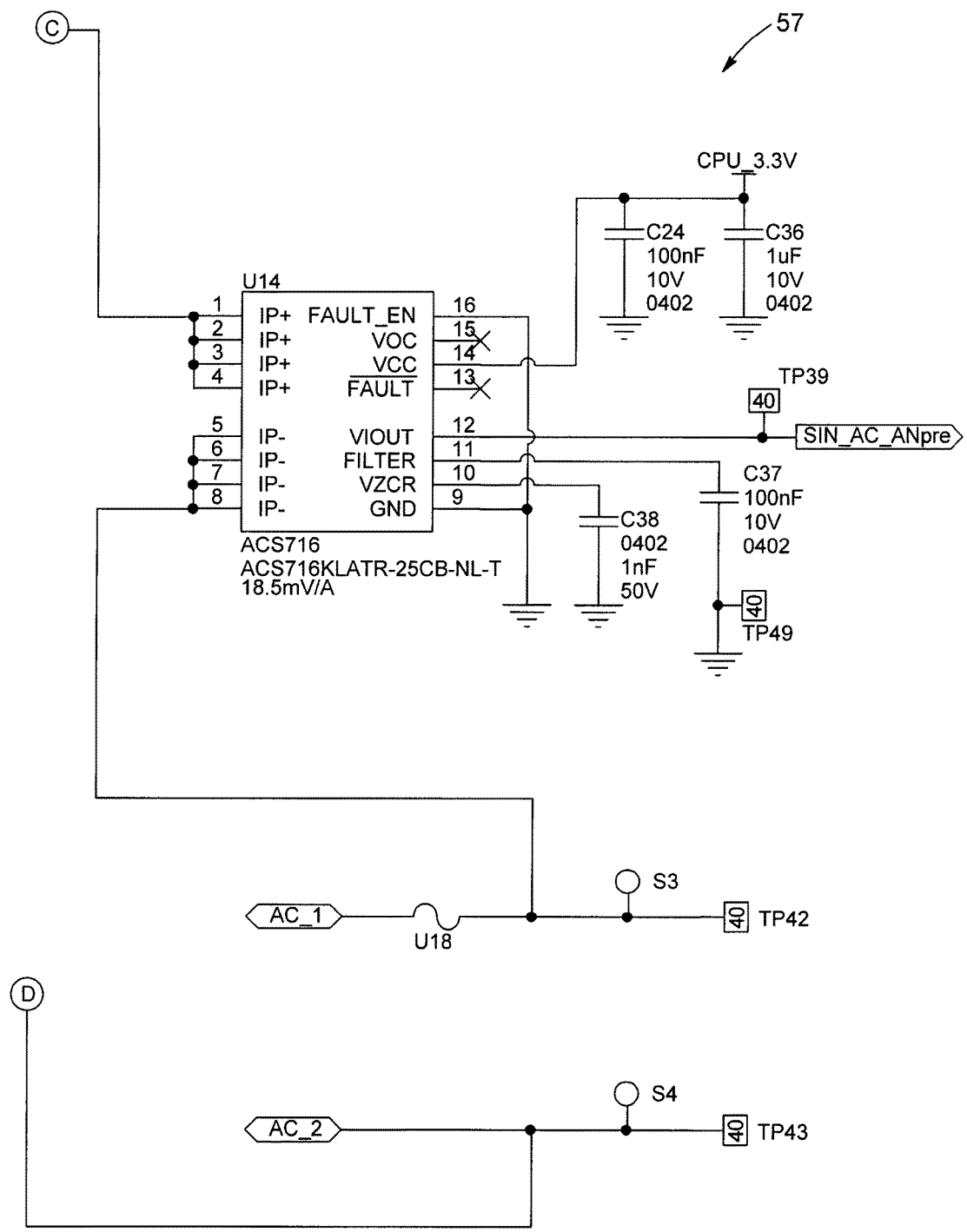
Figure 23:
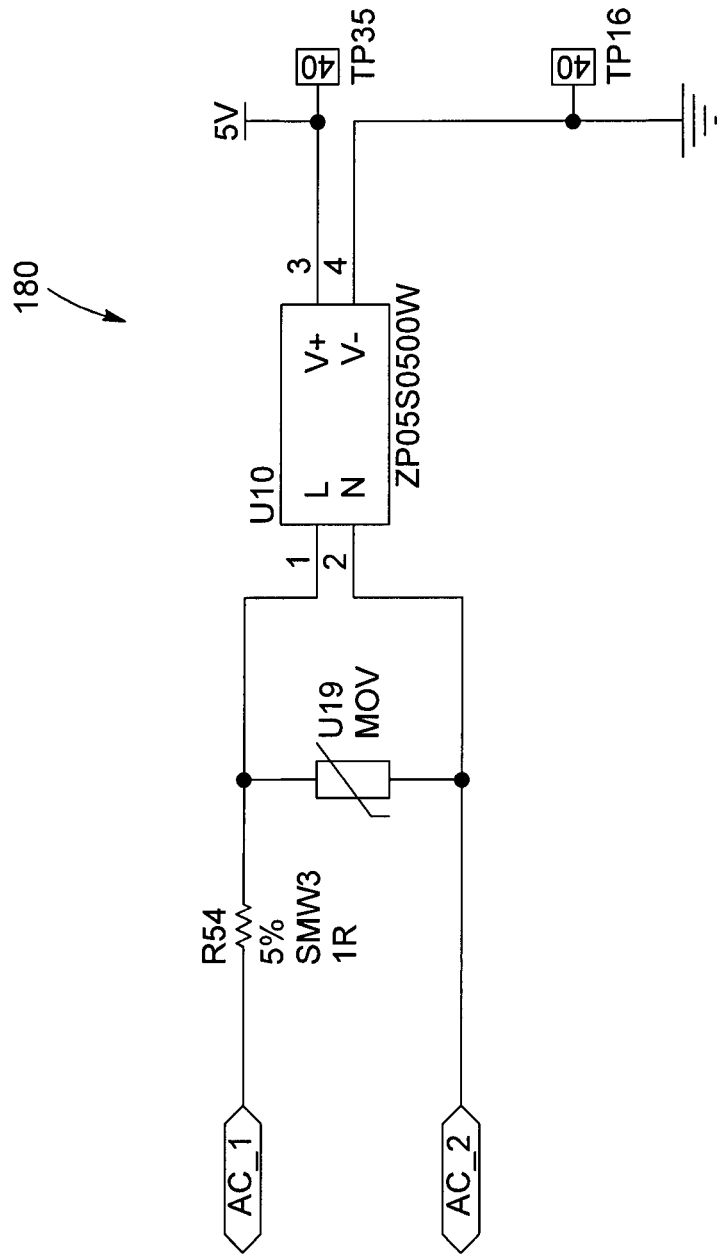
FIG. 23 is an electronic diagram of a power downstep component of a thermostat unit, in accordance with an embodiment.
Figure 24:
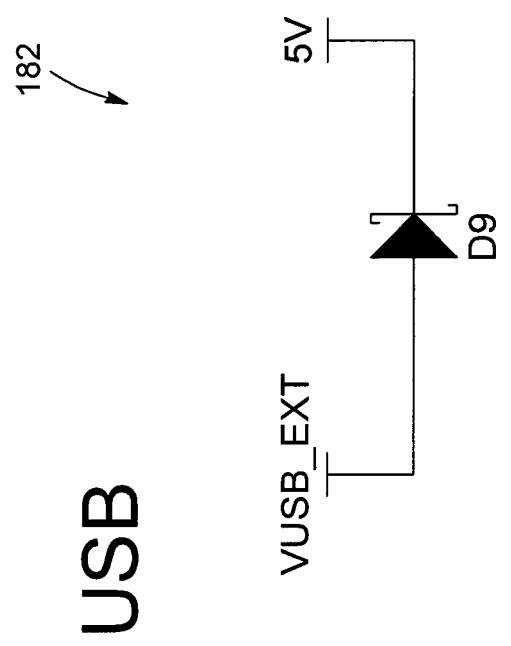
FIG. 24 is an electronic diagram of another USB component of a thermostat unit, in accordance with an embodiment.

Referring now to FIGS. 3, 5 and 6, each thermostat unit 14 is connectable between a power supply 15 and a resistive heating element 16. The thermostat unit 14 comprises an input port 70 for receiving 212 input power from the power supply 15, a memory 112 for storing 214 a target temperature and a current temperature, a calculator 114 for calculating 216 a temperature difference between the current temperature and the target temperature, a power supply module 116 for controlling 218 the input power received, an energy storage device 118 connected between the power supply module 116 and electronic components 40 of the thermostat unit 14, and an output port 72 connected to the power supply module 116. The input port 70 is connectable to the power supply 15 and the output port 72 is connectable to the resistive heating element 16.

The memory 112, the calculator 114 and the power supply module 116 are integrated in a controller 51 such as encryption-capable micro-controller 52.

The power supply module 116 is operable between a heating mode 220 and an energy storage mode 222. In the heating mode 220, the input power is channeled to the output port 72 for supplying power to the resistive heating element 16 based on the temperature difference. In the regenerative mode 222, the input power is channeled to the energy storage device 118 in order to recharge the energy storage device. Advantageously, the power is stored in the energy storage device is supplied to the electronic components 40 of the thermostat unit 14.

In a particular embodiment, the energy storage device 118 comprises a supercapacitor 119. In alternative embodiments, the energy storage device 118 may comprise one or more rechargeable battery or the like.

The electronic components 40 may include a display screen component, a button component, an LED component, a light component, a communication component. The electronic components 40 may further comprise the controller 51.

The thermostat is equipped with a temperature probe 128 for reading the current temperature. The temperature probe 128 is connected to the micro-controller 52. The target temperature may be received via the central controller 12 or via the display screen 42.

The thermostat further comprises a proportional-integral-derivative (PID) controller 122 which comprises the calculator 114. The thermostat further comprises a clock 120 in communication with the power supply module 116 in order operate the power supply module 116 in the heating mode 220 during a heating period 224, and to operate the power supply module in the regenerative mode 222 during a regenerative period 226. The clock is integrated in the micro-controller 52. The PID controller 122 is adapted to determine the heating period by calculating 228 a proportion of a default period 230 as a function at least of said temperature difference 216. The PID controller 122 is in communication with the power supply module 116 in order to send to the power supply module 116 the heating period having been calculated 228.

In addition, the power supply module 116 comprises a switch 124 in order to mutually exclusively engage each of said heating mode 220 and said regenerative mode 222, that is to say, when the power supply module 116 is operated in the regenerative period, the heating mode 220 is interrupted.

The circuitry of the thermostat 14 further comprises a circuit switching mechanism 56 connected between the power supply module 116 and the output port 72. The switching mechanism 56 comprises one or more triode for alternating current (TRIAC) 57. In the heating mode 220, the power is channeled through the TRIAC assembly 57 and to the output port 72. Advantageously, the channeled power is switched between TRIACs in order to dissipate heat in an efficient manner. In an embodiment, the TRIAC assembly 57 comprises 6 TRIACs in order to dissipate heat more efficiently. In an alternate embodiment, the circuit switching mechanism 56 may comprise a metal-oxide-semiconductor field-effect transistor (MOSFET) and/or a relay system, in addition to or as a replacement of said TRIACs.

The thermostat unit 14 is further equipped with a printed circuit board (PCB) 50 which includes the micro-controller 52, the supercapacitor 119 and the TRIAC assembly 57.

Further, the thermostat unit 14 comprises communication module 36 connected to the controller 51. The communication module comprises a radio-frequency (RF) transceiver 38, 39 which may be adapted to communicate one or more of the following communication protocols: Wi-Fi, Z-Wave, Zigbee™, Bluetooth™' Bluetooth™ LE and cellular. In some embodiments, the communication module 38, 39 is detachable from the thermostat unit 14, that is to say, the thermostat unit 14 includes a connector configured to receive the communication module 38, 39, in order to connect and disconnect the communication module 38, 39 thereto.

Figure 25:
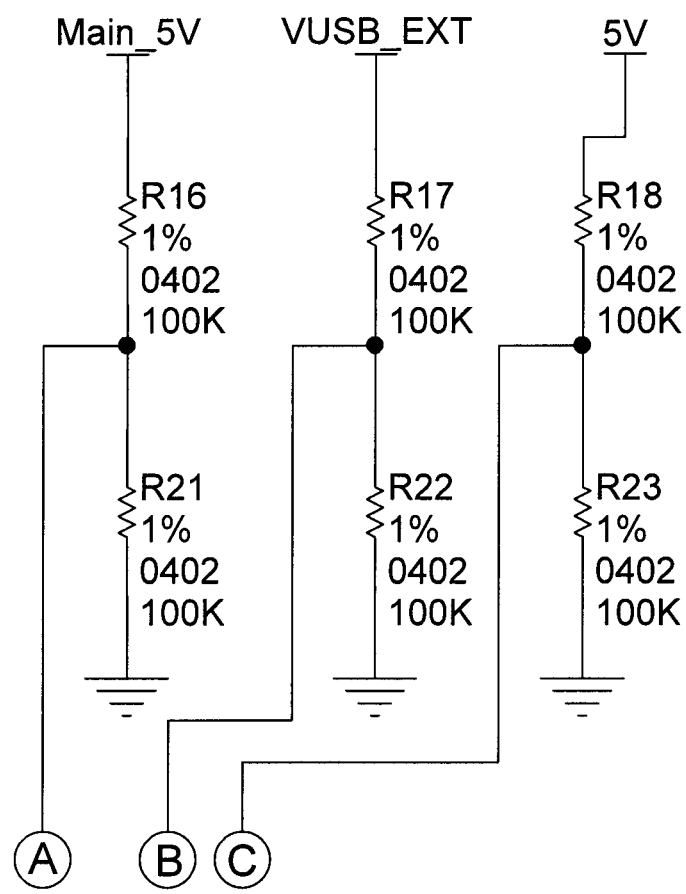
FIG. 25 is an electronic diagram of a supply measurement component of a thermostat unit, in accordance with an embodiment.
Figure 25:
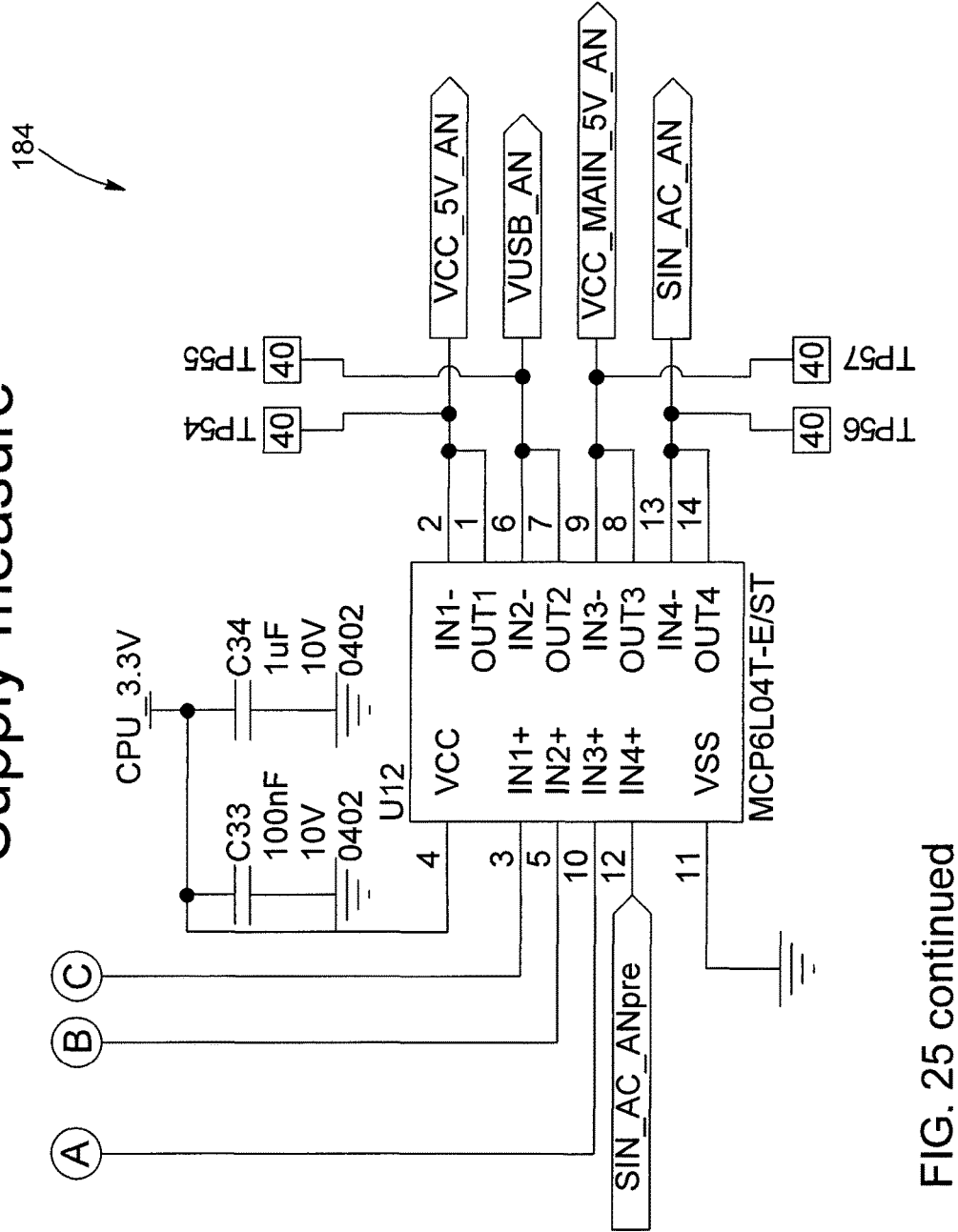
Figure 26:
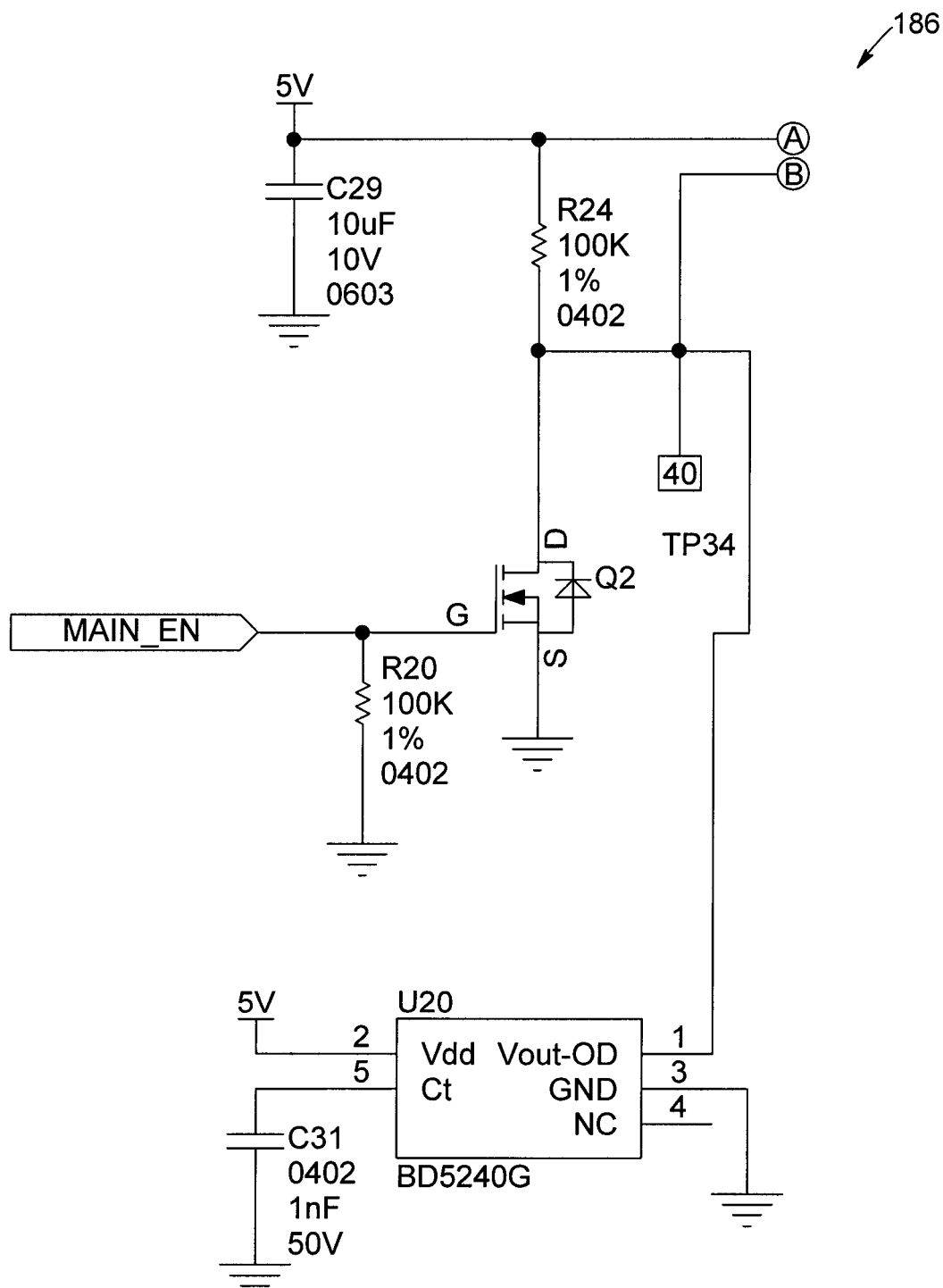
FIG. 26 shows electronic diagrams of a power management component for the supercapacitor of a thermostat unit, in accordance with an embodiment.
Figure 26:
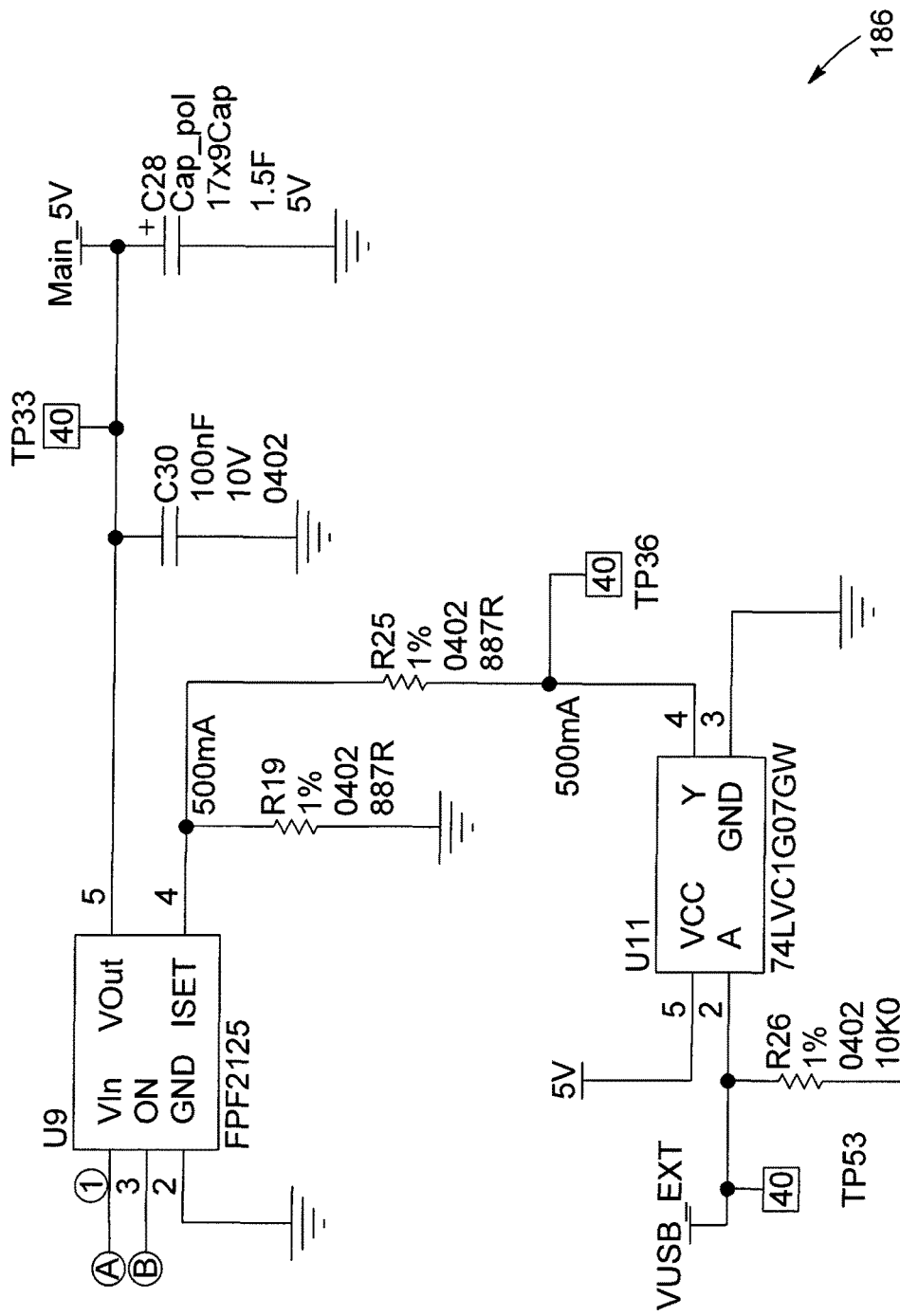
Figure 26:
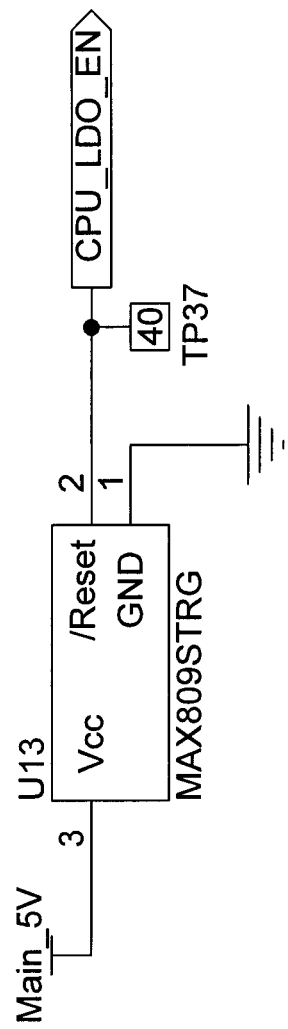

FIGS. 7 to 26 show electronic diagrams of various components of the thermostat unit 14 which are each mounted on the PCB 50. Namely there are shown an electronic diagram for each of the following components of the thermostat unit 14:

a central processor unit (CPU) component 150 (FIG. 7);
a flash memory component 152 (FIG. 8);
a CPU Low-DropOut (LDO) regulator component 154 (FIG. 9);
a Serial Wire Debug (SWD) component 156 (FIG. 10);
a CPU supply and decoupling component 158 (FIG. 11);
a temperature and humidity sensor component 160 (FIG. 12);
an ambient light control component 162 (FIG. 13);
a liquid-crystal-display (LCD) LDO component 164 (FIG. 14);
an LCD backlight control component 166 (FIG. 15);
an LCD touchscreen controller component 168 (FIG. 16);
an LCD component 170 (FIG. 17);
an external universal serial bus (USB) input component 172 (FIG. 18);
a universal smart network access port (USNAP) connector adapter input component 174 (FIG. 19);
a buzzer component 176 (FIG. 20);
a WI-FI component 178 (FIG. 21);
a TRIAC assembly component 57 (FIG. 22);
a power downstep component 180 (FIG. 23);
another USB component 182 (FIG. 24);
a supply measurement component 184 (FIG. 25); and
a power management component 186 (FIG. 26).

The supply measurement component 184 illustrated in FIG. 25 measures the current (A) consumed by the resistive heating element 16 (see FIG. 3) for a given heating period. From the measured current (in amperes) and duration of the heating period (in seconds) the power consumed by the resistive heating element 16 may be calculated, for example on the cloud platform 66 (see FIG. 2A, for example).

The power management circuit 186 illustrated in FIG. 26 allows, for example, monitoring the supercapacitor, controlling the components powered by the supercapacitor, monitoring the CPU and switching off the CPU when the supercapacitor does not have sufficient charge to supply power to the CPU. The power management circuit 186 further prevents backfeed.

As previously mentioned, the thermostat unit 14 may be integrated in a broader thermostat system 10. With reference to FIG. 2A, the thermostat system 10 comprises a central controller 12 and a plurality of the above-described thermostat units 14. The central controller 12 is equipped with communication module for sending a control signal and the thermostat units are each adapted to receive the control signal from the central controller 12 via the communication module and to operate the power supply module 116 in response to the control signal received. For example, the control signal may include data representing the target temperature.

The central controller 12 may be integrated in a central server, a cloud-based server 66, a home automation gateway 18 (see FIG. 2B), and/or the like. The central controller 12 comprises a memory 13 for storing user settings and rules, and is adapted to control the operation of each thermostat unit 14 based on the user settings and rules.

In some embodiment, the communication module 36 of each thermostat unit 14 is further adapted to enable two-way communication with the central controller 12 and/or other thermostat units 14.

In operation, FIG. 6, with further reference to FIGS. 3 and 5, shows a method 200 for managing power supply in a thermostat unit 14 connected between a power supply 15 and a resistive heating element 16.

The power supply module 116 is operated alternatively between the heating mode when power is supplied to the resistive heating element 16 for heating and to the regenerative mode when the power is supplied to the energy storage device 118 for storing power to be supplied to the electronic components 40 of the thermostat unit 14. The heating and regenerative modes are repetitively alternated, resulting in a pulsing of the heating mode 220. The heating mode 220 is operated during a heating period 224 and the regenerative mode 222 is operated during a regenerative period 226.

When the demand for heating is high, for example when the current temperature is relatively low in comparison to the target temperature, then it is desirable for the heating period 224 to be relatively long. When the demand for heating is relatively low, for example, when the current temperature is approaching the target temperature or when the current temperature should be maintained (i.e. the current temperature is the same or almost the same as the target temperature), then the heating period 224 should be relatively short in order to avoid overheating. In yet another case, when the current temperature substantially exceeds the target temperature, it may be desirable to skip a heating period 224, in order to allow lowering the current temperature.

A default period 230 is defined within which the heating mode 220 and the regenerative mode 222 are to be each executed once. The default period may correspond for example to 10 seconds. It is to be understood that the default period may vary depending on embodiments, or may even vary in time for in a particular implementation of the method. It will be readily understood also that the default period 230 may be set at the central controller 12 or within the micro-controller 52.

Under conditions where maximum heating is required, the heating period may last 9.5 seconds, leaving 0.5 seconds to complete the default period of 10 seconds. A minimum of 0.5 is dedicated to recharge the energy storage device. Thus the maximum heating period is set to 9.5 seconds, that is to say 95% of the default period. For illustrative purposes, such maximum energy heating periods may be required when a current temperature is more than 3° C. lower than the target temperature. The 0.5 seconds of operating in the regenerative mode, allows recharging at least in part the energy storage device, which must be kept charged at all times in order to supply power to the electronic components of the thermostat unit. Thus, although maximum power is demanded for the resistive heater, the 5% off-time (i.e. when the heating mode is interrupted) is negligible for most heating needs in homes and buildings, and advantageously allows recharging the energy storage device.

As the current temperature approaches the target temperature, it is desirable to gradually shorten the heating periods in order to slow down the heating and avoid overshooting the target temperature. For illustrative purposes when the current temperature is about 2° C. under the target temperature, the desirable heating period may be about 50% of the default period. In this context, this leaves about 5 seconds to operate the power supply module in the regenerative mode, or until the energy storage device is fully recharged. Finally, when the current temperature reaches the target temperature, a heating period of about 20% may be desirable, leaving even more time for the energy storage device to be recharged. In another case, if the current temperature is higher than the current temperature, for example by about 0.5° C. or more, then the heating period should be 0% of the default period, leaving the entire default period to the regenerative mode.

The heating period is preferably gradually adjusted as the current temperature changes. In order to achieve this, a proportional-integral-derivative (PID) controller 122 is used in order to iteratively calculate the heating period demanded (i.e. a percentage or proportion of the default period), on the basis of the current temperature and target temperature. It is to be understood that a proportional-integral (PI) controller may be used as well, in accordance with some embodiments, which is equivalent to a PID controller having a derivative term of 0, as will be readily understood by the skilled person.

In addition, to the normal operation of the thermostat on the basis of the calculated heating period, depending on the usage made of the electronic components, the heating mode may be interrupted before the calculated heating period ends, when the energy storage module requires to be charged. In some cases the heating mode may even be skipped for one or more iteration. There is thus a monitoring mechanism which forces the power supply module to operate in the regenerative mode when the energy storage device is lower than a threshold level, for example when the charge reaches 3 Volts (V) or lower.

The method 200 shown in FIG. 6, will now be described in other words, still with with further reference to FIGS. 3 and 5. As can be seen, input power is received 212 from a power supply 15 and directed to the power supply module 116. A target temperature and a current temperature are provided 214 to the PID controller 122. The PID controller 122 calculates 216, by means of a calculator 114, a difference between the current temperature and the target temperature. The input power is then controlled 218 by operating the power supply module 116 between a heating mode 220 in which in the input power is channeled to the output port 72 for feeding the resistive heating element 16 based on the temperature difference 216, and a regenerative mode 222 wherein the input power is channeled to the energy storage device 118 for charging said energy storage device 118 in order to supply power therefrom to electronic components 40 of the thermostat unit 14. The method 200 further comprises supplying power from the energy storage device 118 to said electronic components 40 of the thermostat unit 14.

The PID controller 122 is adapted to calculate 228 the heating period on the basis of the calculated temperature difference 216. More particularly, a default period 230 is further provided. The PID calculates a proportion of this default period 230 as a function of the temperature difference 216. This proportion corresponds to a heating period which is sent to the power supply module 116. It is to be understood that the calculated heating period 224 may vary at each iteration of the PID controller 122 based on a number of factors, including the difference between the current temperature and the target temperature.

The method 200 further comprises monitoring 234 a charge level of the energy storage device 118 in order to operate the power supply module 116 based on said charge level of the energy storage device 118. More particularly, the charge level is captured by a sensor 126 and compared with a minimal threshold, and when the charge level is below the minimal threshold, the power supply module is operated in the regenerative mode. The regenerative mode is engaged for a predetermined period of time, for example 1 second or until the charge level of the regenerative storage device reaches a predetermined level, for example 3V or less. The predetermined level may correspond to a full charge of the energy storage device, according to embodiments. According to embodiment, operating the power supply module in the regenerative mode fully recharges the energy storage device when said regenerative mode is operated for a cumulative duration of about 1 second.

Under conditions when the energy storage device 118 is above the minimum threshold value, the power supply module 116 operates in the heating mode 220 during the calculated heating period 224, and in the regenerative mode 222 during a regenerative period 226 on the basis of the heating period 224. For example, the regenerative period 222 may begin for a given iteration when the heating period 224 ends. Under such conditions (when the energy storage device does not require emergency recharging), the regenerative period 224 may have a duration corresponding to a difference between the default period 230 and the heating period 222 set, or a duration shorter than said difference.

As previously mentioned, the regenerative mode is operated while the heating mode is disengaged (i.e. when the heating mode is not operative), that is to say, the heating mode is interrupted in order to operate the power supply module in the regenerative mode. Thus, the power supply module 116 interrupts the heating mode to engage the regenerative mode, by means of the switch 124. Similarly, the power supply module 116 interrupts the regenerative mode to engage the heating mode, by means of the switch 124. Thus, the heating period and the regenerative period are mutually exclusive at any given time.

The method 200 further comprises transmitting data from the thermostat unit 14 over a wireless network 19 (see FIG. 2A). The data may be transmitted to a cloud platform 66 (see FIG. 2A), for reporting back data to the central controller 12. Such data may include, for example, a current temperature (i.e. the current temperature having been captured at the thermostat unit 14), a current power consumption, an ambient lighting status, an owner of the device, a date/time, a time zone, etc. The transmitting may be executed periodically at a set interval of time, for example, every 5 minutes, or in response to receiving a data request, for example, when a user accesses the user interface 42 of the thermostat unit 14.

Other Optional Aspects and Features

Various optional features and examples, and certain components for the thermostat system and operation will be described below. It should be understood that the features and examples described below may be combined with other aspects of the thermostat unit, system and method as described hereinabove in accordance with various embodiments of the present invention.

Figure 2B:
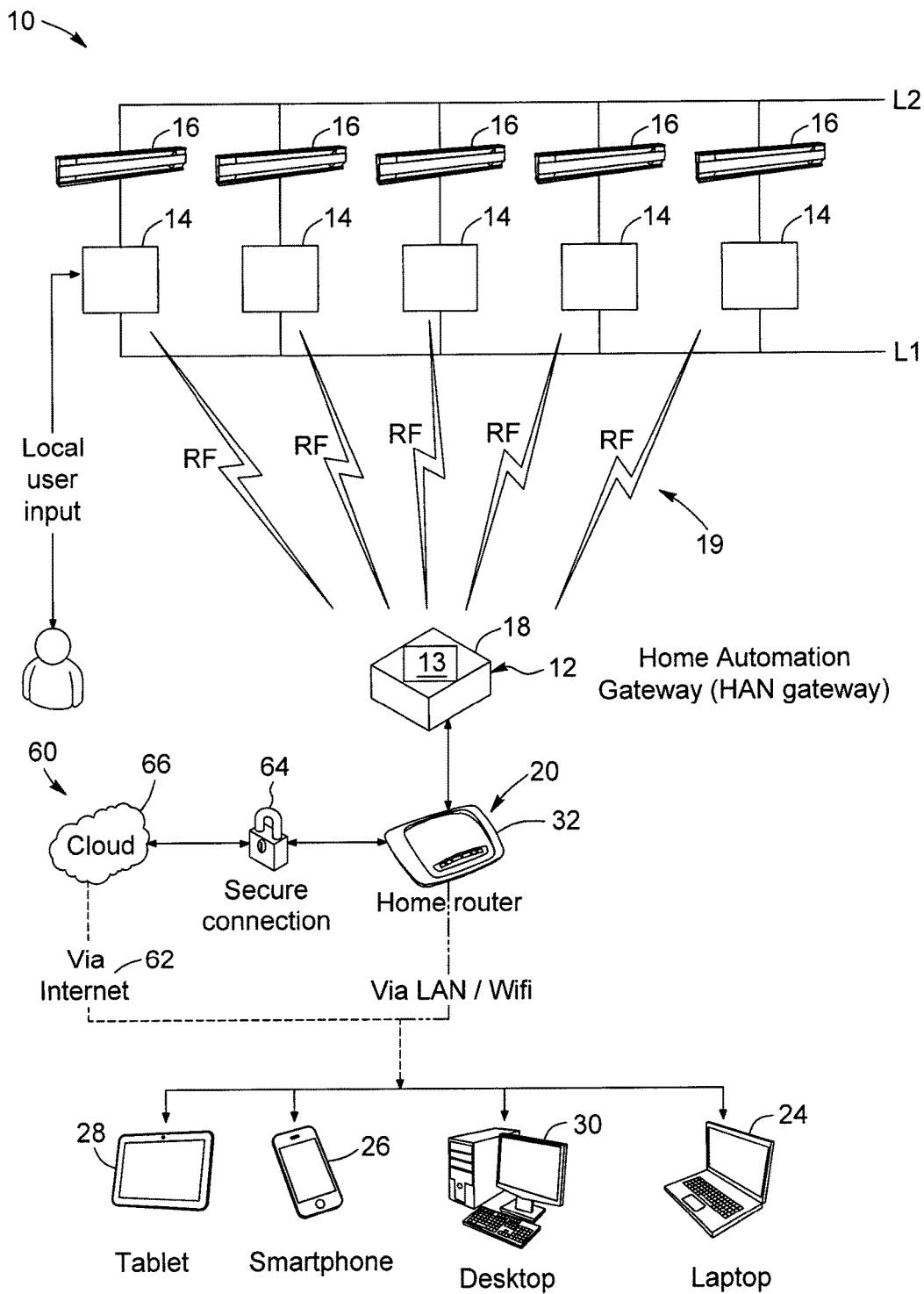
FIG. 2B is a schematic diagram showing a thermostat system, in accordance with another embodiment of the present invention.

As better illustrated in FIGS. 2B, 3 and 5, there is provided a thermostat system 10 comprising a central controller 12 having a communication module for emitting a control signal. The system 10 further comprises a plurality of thermostat units 14, each thermostat unit 14 being connectable between a power supply 15 and a resistive heating element 16, each thermostat unit 14 further comprising a communication module 36 for receiving the control signal from the central controller 12 in order to control the supply of power fed from the thermostat unit 14 to said resistive heater 16 in response to the control signal.

There is thus provided a thermostat unit for controlling a power supply to a resistive heater, the thermostat unit comprising: an input port connectable to a power supply; an output port connectable to a resistive heating element, for supplying power thereto; a communication module for receiving a control signal; and a controller for supplying said power in accordance with the control signal.

The resistive heating element may be provided in a resistive heater which may be a line-voltage resistive-type baseboard heater and/or motor driven forced-air resistive heater (fanned air heater).

The thermostat comprises electronic components and a power management system for powering said electronic components with the power supply. The electronic components may include the controller, and may further include a display screen.

As better illustrated in FIG. 3, the thermostat unit 14 comprises an input port 70 connectable to a power supply; and an output port 72 connectable to the resistive heater 16, for supplying power thereto.

As better illustrated in FIG. 4, the thermostat unit 14 further comprises a user interface 40 including a display screen 42, command buttons 44, status light-emitting diode (LED) 46 and a courtesy or night light 48 (LED lights on its bottom side, whose state, color and intensity is controllable either remotely via the interface or locally using the buttons 44).

The thermostat unit 14 is further equipped with a printed circuit board (PCB) 50 which includes an encryption-capable micro-controller 52.

Moreover, the communication module 36 of the thermostat unit 14 is provided by a radio-frequency (RF) module 38, 39 to enable two-way communication with other units 14 and/or with the central controller 12. The RF module 38, 39 may operate through a proprietary serial protocol and/or under a standardized serial protocol, such as ANSI-CEA 2045, as will be better explained further below.

According to a particular embodiment, the communication module 38, 39 of the thermostat unit 14 is a detachable communication component which allows for interchanging communication components of different communication protocols. Indeed, given the diversity of communication protocols available in the context of home automation, it is desirable to allow the user to choose or adapt the device to the desired or required protocol. In one embodiment, the detachable communication component is provided by a ANSI-CEA 2045 compliant "U-Snap" module, changeable by the end user in order to interact with existing networks using Wi-Fi, Z-Wave, Zigbee or other proprietary home automation standards. Through the use of an ANSI-CEA 2045 compliant RF module 39 and micro-controller, the end user has the choice of protocol to either adapt to the existing infrastructure or to create a new dedicated network.

Alternatively, the communication module 36 may be integrated with the thermostat unit 14.

It is to be understood that, in accordance with alternate embodiments, the communication module may operate according to other wireless communication protocols such as Bluetooth™, Bluetooth™ LE, cellular, any suitable proprietary RF protocol put forth by utilities companies, and/or the like.

It is to be understood also that in some embodiments a same communication module may allow communication with other thermostat unit as well as with the central controller. In other embodiments, the communication module for communicating between thermostat units is operable in a first communication protocol while the communication module for communicating with the central controller is operable in a second communication protocol. It is to be understood also that a same communication module may be used to communicate with both other thermostat units and the central controller. It is to be understood also, that the thermostat unit is only in communication with the central controller, in accordance with some embodiments.

In addition, each thermostat unit 14 has a power downstep circuit 54, which in accordance with some embodiments may comprise a "power stealing" and/or a "power harvesting" mechanism in order to provide sufficient current to power the PCB 50 and the RF module 38, 39 in a reliable and standard-compliant manner. The RF module 38, 39 is managed by the CEA2045 standard of voltage, amperage and duration.

Each thermostat unit 14 further comprises a circuit switching device 56 such as a TRIAC, MOSFET, or relay.

In the embodiment shown in FIG. 2B, a central controller 12 is provided by a home automation gateway 18, which is further in communication with an internet gateway 20. The home automation gateway 18 is adapted to communicate with each of the thermostat units 14, via its communication module and to control the thermostat units 14 to operate in an efficient/optimal manner according to given rules and user settings. It is to be understood that depending on particular embodiment, the home automation gateway may not be necessary, for example when the RF protocol is standardized for internet protocol communication (e.g. WiFi, cellular).

Examples of user settings may include a particular temperature setting for a predetermined schedule. Another user setting may include setting a maximum temperature difference between rooms.

The system 10 thereby allows monitoring and optimization of electrical energy dedicated to heating. An internet gateway 20, such as an internet router 32, further allows for remote monitoring and management, for example via a computer device such as a laptop computer 24, a smartphone 26, a tablet computer 28, desktop computer 30, and/or the like, through a communication network 60 such as the internet 62, preferably over a secure connection 64 to a cloud platform 66, as depicted in FIGS. 2A and 2B. It is to be understood that a secure connections exists from the device all the way to the cloud (256$b$ AES).

Advantageously, the networked thermostats 14 may communicate between each other and/or via the central controller 12 to operate in an energy efficient manner. Still advantageously, the thermostat system 10 and each of the thermostat units 14 may be monitored and/or controlled remotely through a computer device as described above, by a user of the thermostat system 10, such as a home owner, and/or by a power supplier.

Following are some functional features of the thermostat unit 14:

pulse heating unit to prevent thermal overshoot (i.e. electronic switching of heating load allows for precise control of heat output, prevents heating beyond the set temperature on the thermostat);
communicate with central gateway and/or other similar devices to exchange energy usage, room temperature, set point, clock and program information;
receive local input via physical buttons on device;
locally display information such as room temperature, set point, connection status;
optional courtesy nightlight;
optional room humidity sensor;
PID logic controller (proportional integral derivative) which in turn controls pulsing of the load;
"Non-pulsing" switching mode for motors and fan-equipped heaters;
RF module enables "meshing" of all similar devices in a house, allows for centralized control and energy monitoring;
Visual feedback RGB LED provide users with clear, non-intrusive feedback to their heating habits;
Courtesy light built into the device, controlled locally and via remote commands;
Non-mechanical "Up" button for local input of various controls;
Non-mechanical "Down" button for local input of various controls;
Mechanical, PCB-mounted "Reset" button for local input of various controls.

Following are some technical specifications of the thermostat unit 14:

16 amps switched load on 240V, 60 Hz (50H, variation for EU is also to be considered);
Electronic load switching (no relays);
Single port for U-Snap/CEA-2045 DC module;
1-gang form factor;
2-wire configuration, line to line, no neutral;
back-lit LCD display, LED display, electrophoretic ink display, or pixel matrix display;
Non-mechanical up/down buttons (e.g. capacitive or resistive or touchscreen); LED courtesy light; and RGB LED visual feedback LED.

Following are certification standards which the thermostat unit 14 is compliant to in accordance with embodiments:
RoHS
ANSI-CEA2045 (USNAP)
UL 60730
CAN/CSA-C828-06

CAN/CSA-22.2 NO 24-93
UL 353

Figure 28:
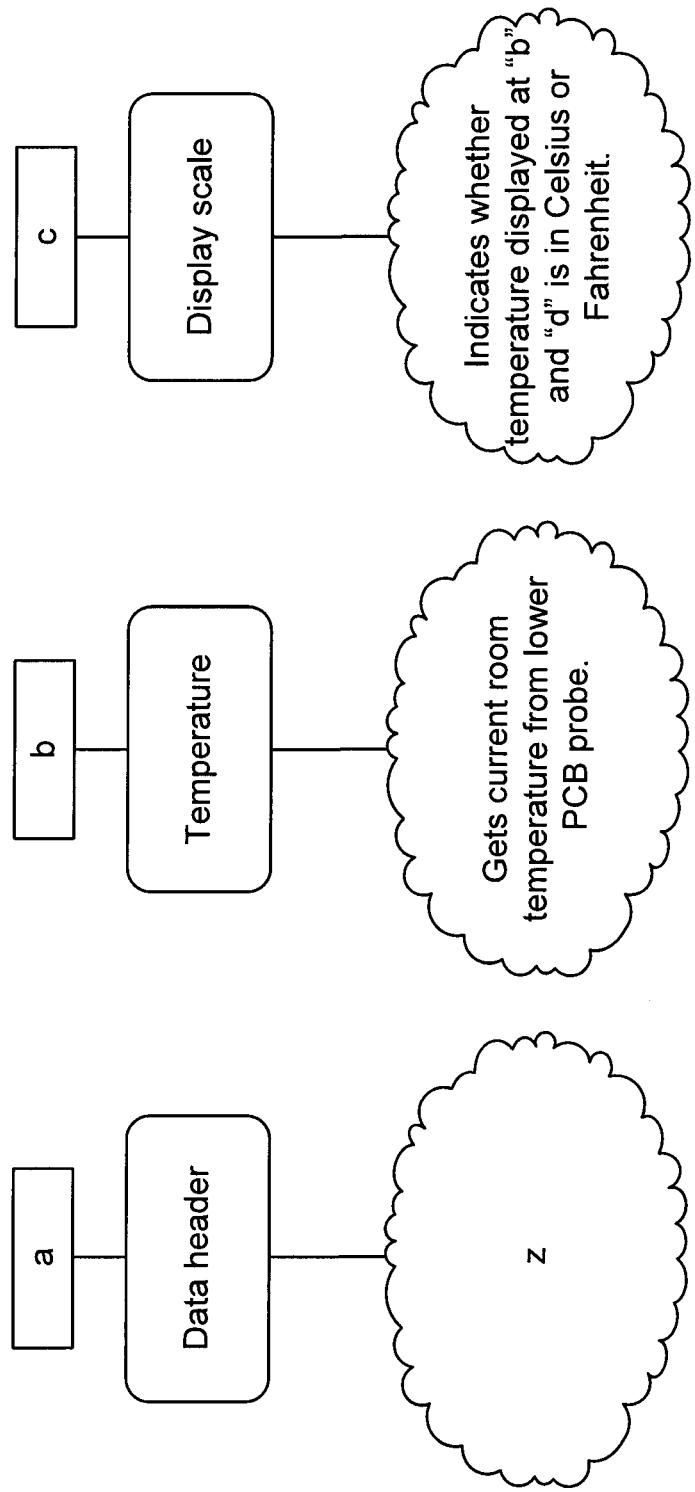
FIG. 28 is a diagram of features shown in FIG. 27A.
Figure 28:
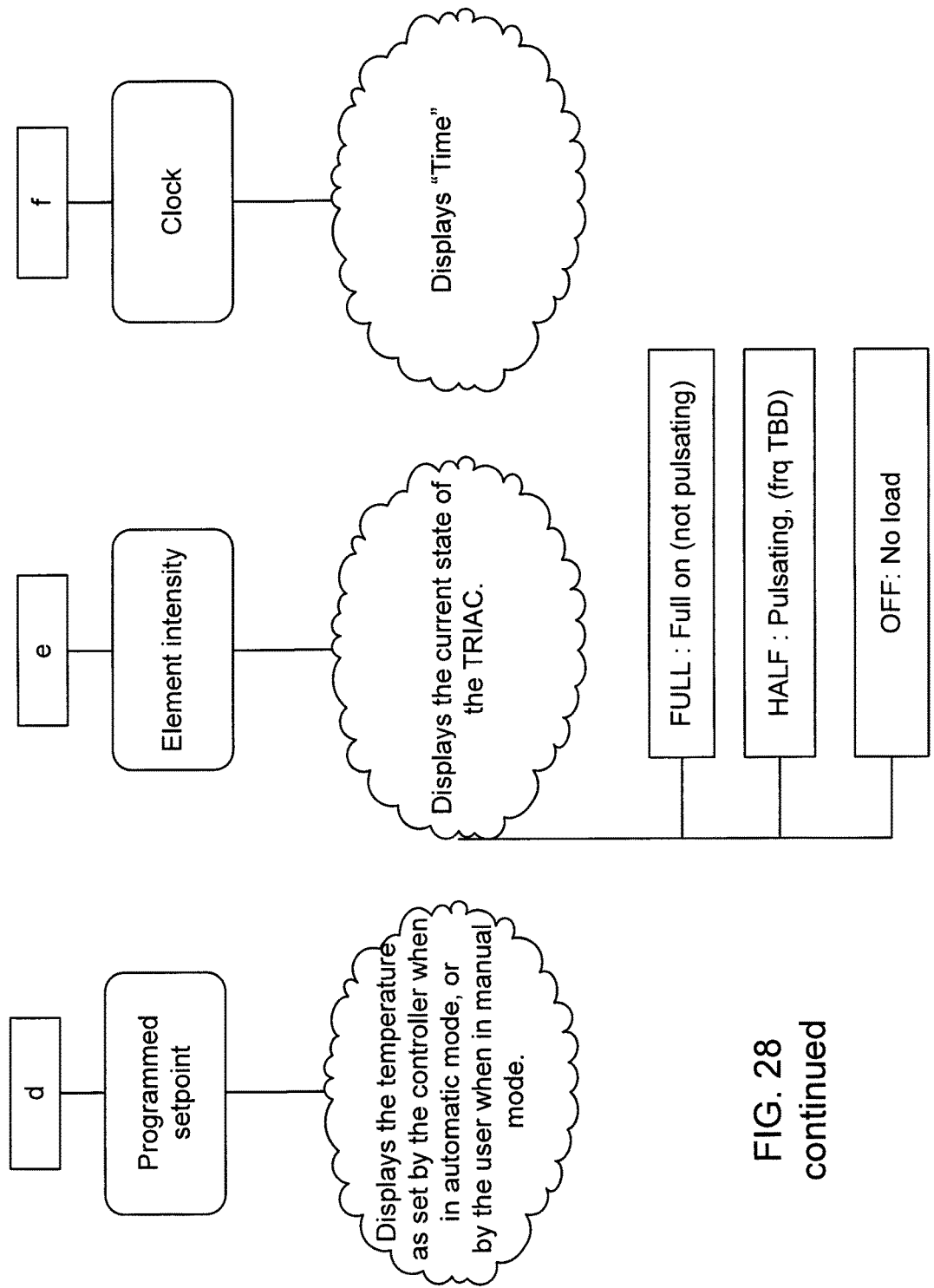
Figure 28:
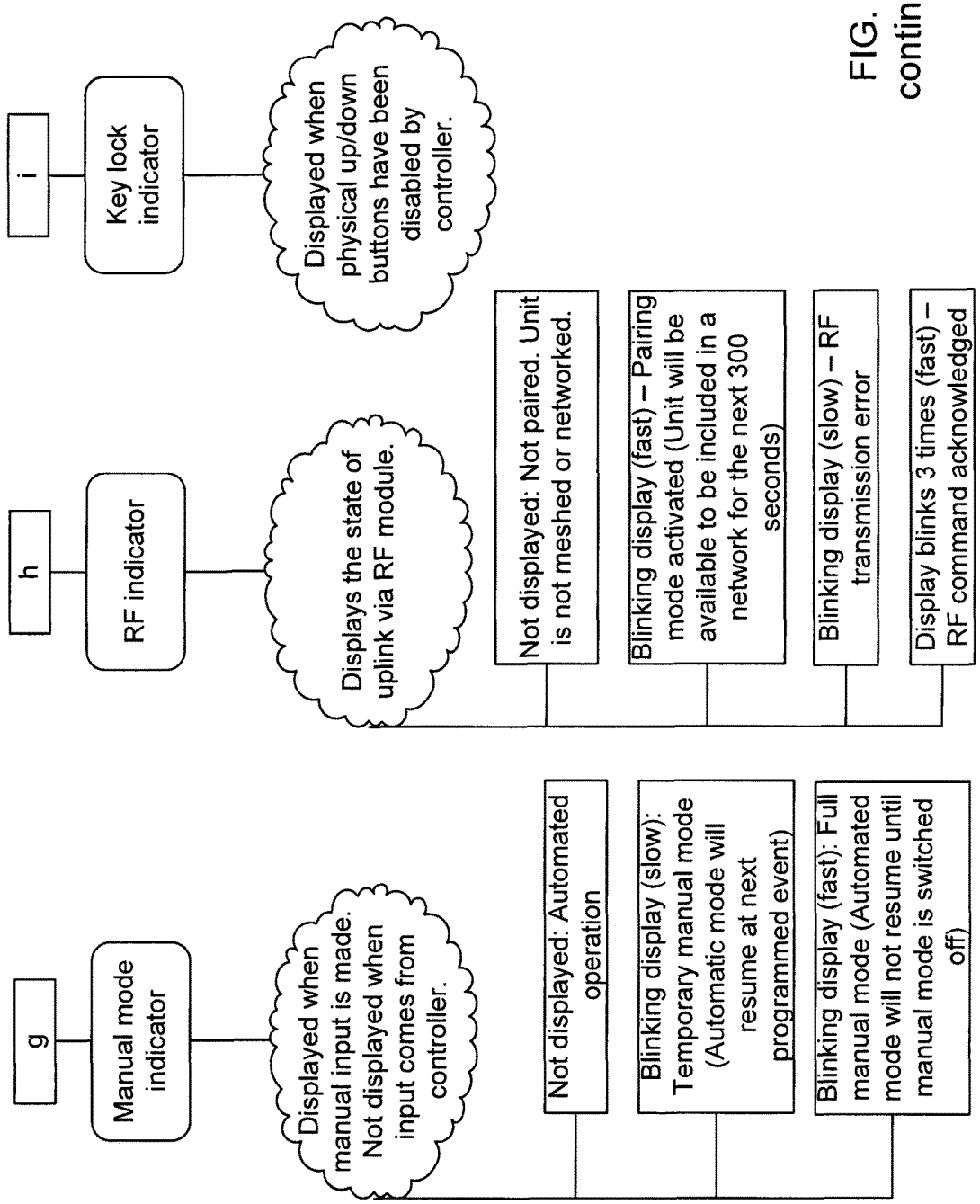

FIG. 27A, with reference to FIG. 28, shows components displayed on the display screen 42 of the thermostat unit 14. Namely, the data header (a) displays a label "room temperature". This label may appear in a user chosen language which may be set via the display screen 42. The temperature (b) is read by an onboard sensor, such as a probe mounted on the PCB 50. The temperature appears in either Celcius or Fahrenheit (c) depending on a user setting. The temperature set point (d) displays the temperature as set by the controller when in an automatic mode or by the user when in a manual mode. The element intensity (e) displays the current state of the TRIAC: "FULL" when full on (not pulsating); "HALF" when pulsating; and "OFF" when no load is applied. A clock (f) displays the time. A manual mode indicator (g) displays an icon when a manual input is made. When the icon is not displayed, this indicates that the operation of the thermostat unit is automated, according to a programmed schedule. When the icon blinks slowly, this indicates that this thermostat unit is operating under a temporary manual mode where the automatic mode will resume at the next programmed event. When the icon blinks at a high frequency, this indicates that the thermostat unit is currently fully operated manually, in that the automated mode will not resume until the manual mode is switched off. An RF indicator (h) displays the state of uplink (or connectivity) via the RF module 38. When it is not displayed, this indicates that the thermostat unit is not paired or networked. When the indicator blinks fast, the pairing mode is activated and the thermostat unit will be available for networking for the next three-hundred (300) seconds. When the indicator blinks slowly, this indicates an RF transmission error. When the indicator blinks three times quickly, it is an indication that the RF command was acknowledged. A key lock indicator (i) displays when physical up/down buttons have been disabled by the controller 12.

Figure 29:
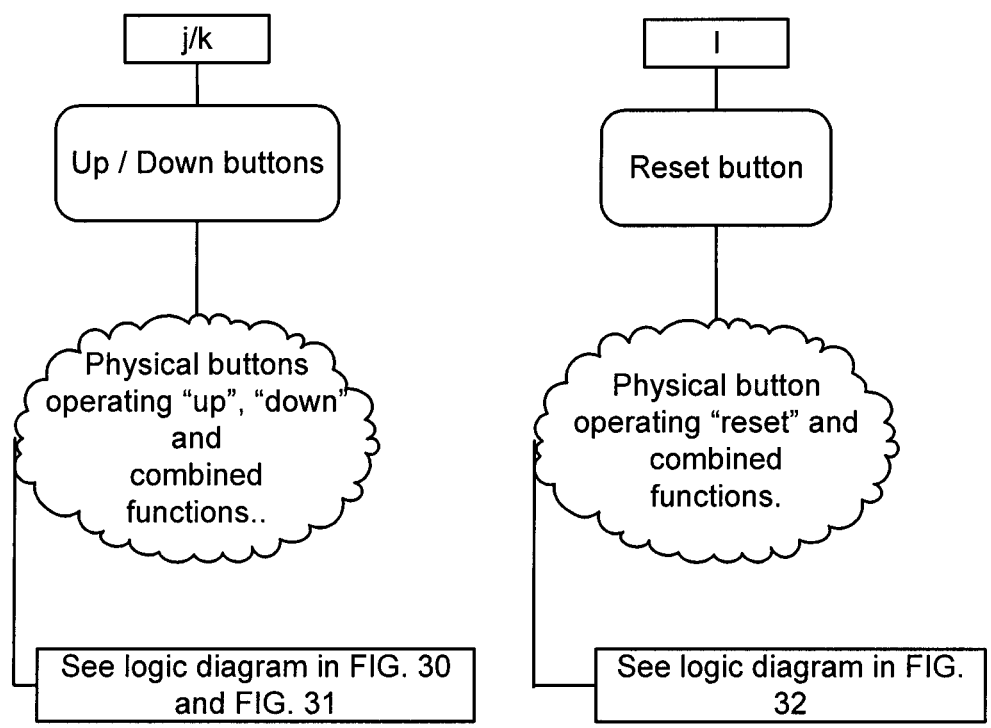
FIG. 29 is a diagram of features shown in FIG. 27B.
Figure 30:
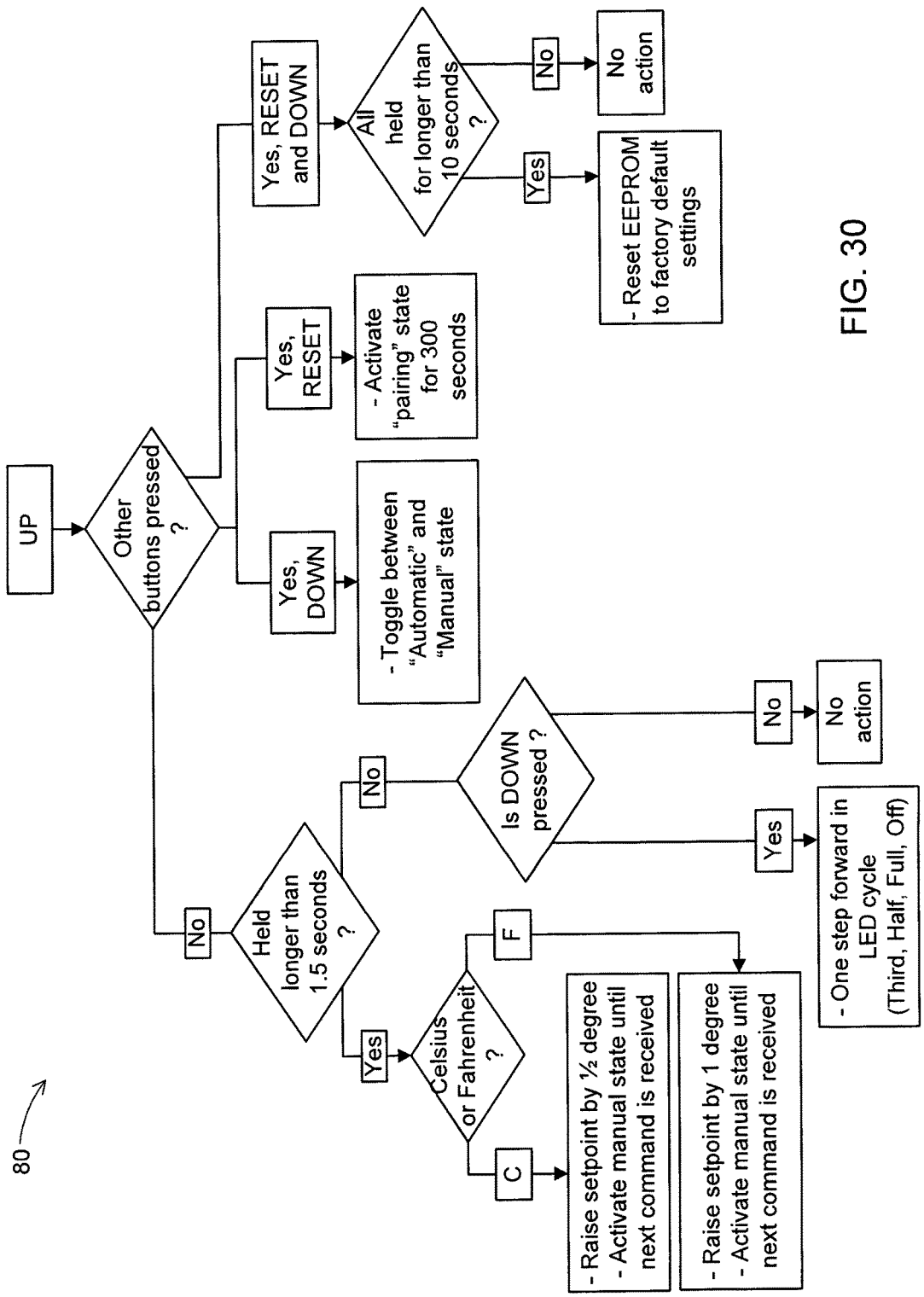
FIG. 30 is a flow chart of operations executed by the thermostat unit shown in FIG. 5.
Figure 31:
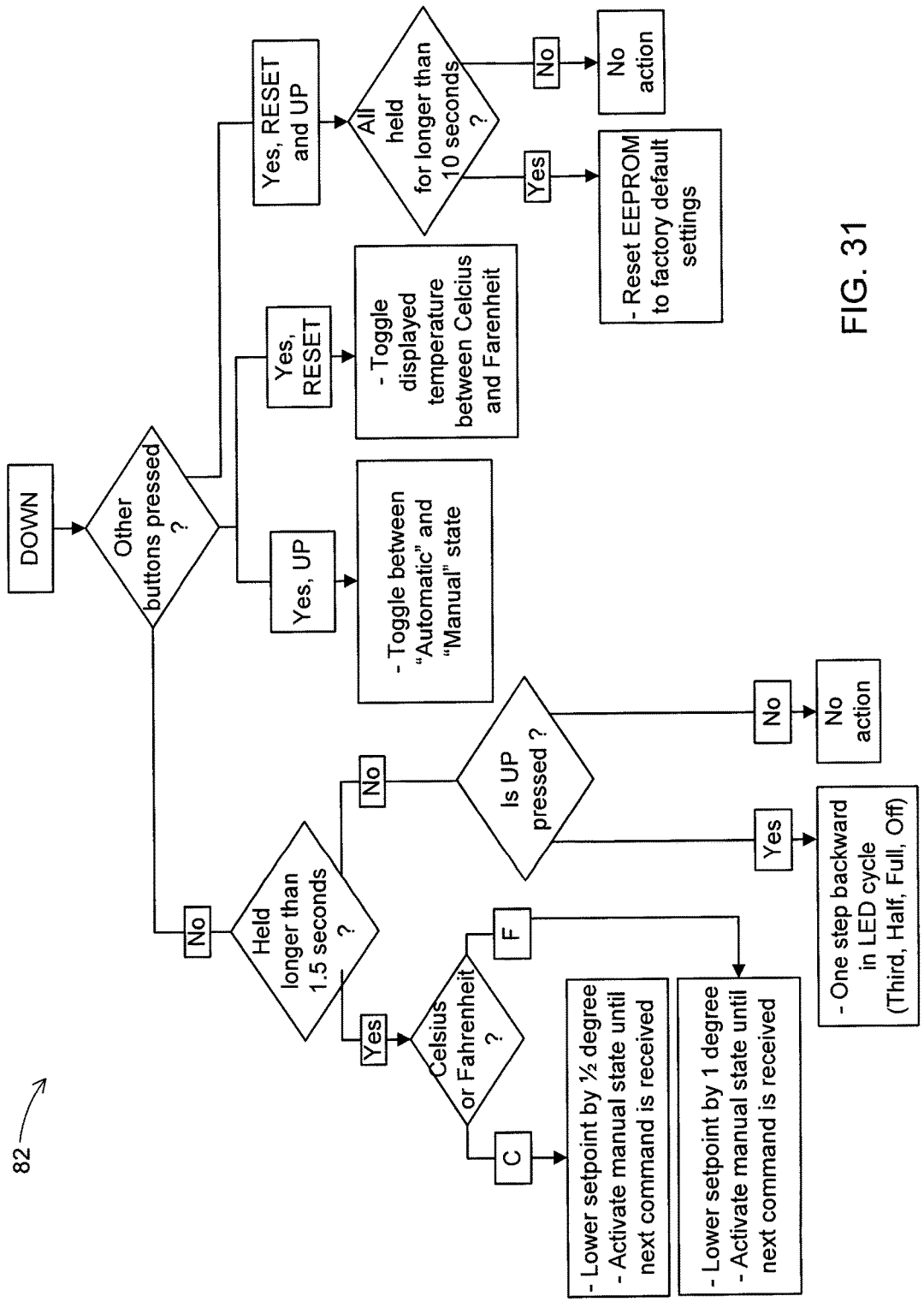
FIG. 31 is a flow chart of operations executed by the thermostat unit shown in FIG. 5.
Figure 32:
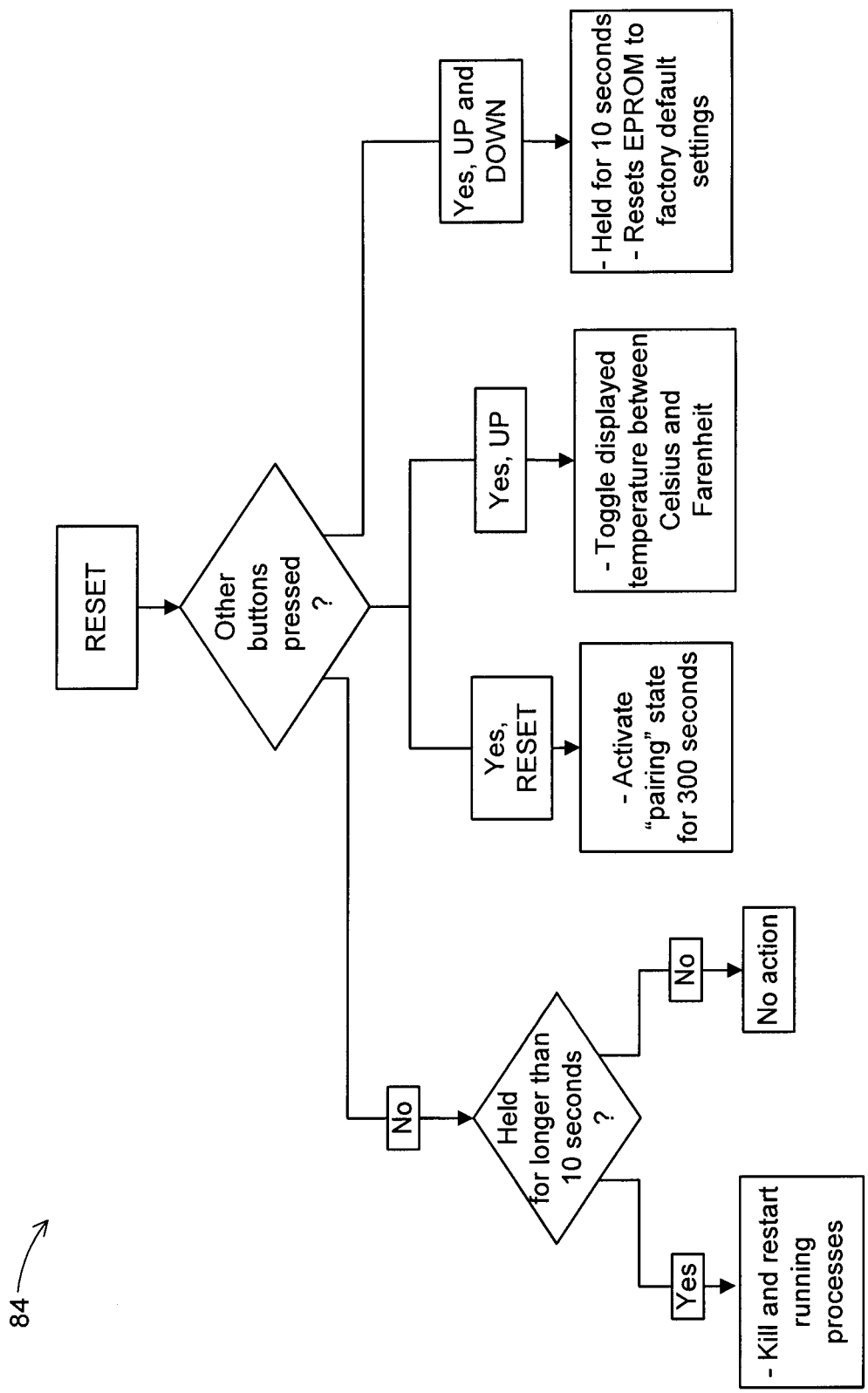
FIG. 32 is a flow chart of operations executed by the thermostat unit shown in FIG. 5.

FIG. 27B, with reference to FIG. 29, shows the functions of the command buttons 44. The up/down buttons (j/k) are physical buttons operating "up", "down" and combined functions, in accordance with the flow charts (logic diagrams) shown in FIGS. 30 and 31. More particularly, in FIG. 30 the logic diagram 80 shows the steps executed by the micro-controller 52 when the up button (j) is pressed. In FIG. 31, the logic diagram 82 shows the steps executed by the micro-controller 52 when the down button (i) is pressed. The reset button is a physical button operating a "reset" and combined functions, in accordance with the logic diagram shown in FIG. 32. More particularly, the logic diagram 84 of FIG. 32 shows the steps executed by the micro-controller 52 when the "reset" button (I) is pressed.

FIG. 27C shows the LED components 46, 48 and associated functions. Namely, a status LED (m) provides visual feedback of load status and a night light LED (n) is controllable remotely by the interface 34, 36 or locally using the buttons 44 on the thermostat unit.

In accordance with alternate embodiments, the display screen is a touch screen. In such embodiments, there may or may not be any physical buttons such as 44. According to an embodiment, the thermostat unit comprises at least a "reset" button (I).

Although the above-described embodiments are directed to resistive heaters, it is to be understood that the thermostat system may alternatively or additionally apply to other heating devices such as water heaters or the like.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A method for managing power supply in a thermostat unit connected between a power supply and a resistive heating element, the method comprising:
   a) receiving, via an input port, input power from a power supply;
   b) providing a target temperature and a current temperature;
   c) calculating, by means of a calculator, a temperature difference between the current temperature and the target temperature;
   d) controlling the input power by operating a power supply module between a heating mode wherein in the input power is channelled to the output port for feeding the resistive heating element based on the temperature difference and a regenerative mode wherein the input power is channelled to an energy storage device for charging said energy storage device in order to supply power therefrom to electronic components of the thermostat unit.

2. The method according to claim 1, wherein the controlling step (d) comprises operating the power supply module in the heating mode during a heating period and operating the power supply module in the regenerative mode during a regenerative period.

3. The method according to claim 2, further comprising after step (c), determining the heating period for the heating mode of step (d), on the basis of the temperature difference calculated at step (c).

4. The method according to claim 3, further comprising monitoring a charge level of the energy storage device, by means of a sensor, wherein the controlling step (d) comprises operating the power supply module based on said charge level of the energy storage device.

5. The method according to claim 4, wherein said monitoring comprises receiving said charge level and comparing said charge level with a minimal threshold, and wherein the controlling of step (d) comprises when the charge level is below the minimal threshold operating the power supply module in the regenerative mode.

6. The method according to claim 5, wherein the regenerative mode is engaged for a predetermined period of time or until the charge level of the regenerative storage device reaches a predetermined level.

7. The method according to claim 6, wherein the predetermined level corresponds to a full charge of the energy storage device.

8. The method according to claim 2, wherein the heating period and the regenerative period are mutually exclusive at any given time.

9. The method according to claim 1, further comprising transmitting data from the thermostat unit over a wireless network.

10. The method according to claim 1, further comprising supplying power from the energy storage device to said electronic components of the thermostat unit.

11. A thermostat unit connectable between a power supply and a resistive heating element, the thermostat unit comprising:
   an input port for receiving input power from the power supply;

a memory for storing a target temperature and a current temperature;

a calculator integrated in a controller, for calculating a temperature difference between the current temperature and the target temperature;

a power supply module integrated in the controller, for controlling the input power received;

an energy storage device connected between the power supply module and electronic components of the thermostat unit; and an output port connected to the power supply module and being connectable to the resistive heating element, wherein the power supply module is operable between a heating mode wherein the input power is channelled to the output port for supplying power to the resistive heating element based on the temperature difference and a regenerative mode wherein the input power is channelled to the energy storage device, in order to supply power to said electronic components.

12. The thermostat unit according to claim 11, wherein the energy storage device comprises a supercapacitor.

13. The thermostat unit according to claim 11, further comprising more than one triode for alternating current (TRIAC) connected between the power supply module and the output port.

14. The thermostat unit according claim 11, wherein the power supply module comprises a switch in order to mutually exclusively engage each of said heating mode and said regenerative mode.

15. The thermostat unit according to claim 11, further comprising a communication module connected to the controller.

16. A thermostat system comprising:
a central controller having a communication module for sending a control signal; and
a plurality of thermostat units in accordance with claim 15, wherein each thermostat unit is adapted to receive the control signal from the central controller via the communication module and to operate the power supply module in response to the control signal received.

17. The thermostat system according to claim 16, wherein the communication module of each thermostat unit is adapted to enable two-way communication with at least one of: one or more other thermostat unit and the central controller.

18. The thermostat system according to claim 16, wherein the central controller is integrated in at least one of: a central server, a cloud-based server and a home automation gateway.

19. A non-transitory computer-readable memory storing data and instructions for execution by a processor to manage power supply in a thermostat unit, when the thermostat unit is connected between a power supply to receive input power supply via an input port, and a resistive heating element, said data and instructions comprising:

i) one or more instructions for providing a target temperature and a current temperature;

ii) one or more instructions for calculating, by means of a calculator, a temperature difference between the current temperature and the target temperature;

iii) one or more instructions for controlling the input power by operating a power supply module of the thermostat unit between a heating mode wherein the input power is channelled to the output port for feeding the resistive heating element based on the temperature difference and a regenerative mode wherein the input power is channelled to an energy storage device for charging said energy storage device in order to supply power therefrom to electronic components of the thermostat unit.

20. The non-transitory computer-readable memory according to claim 19, further comprising one or more instructions for transmitting data from the thermostat unit over a wireless network.

* * * * *